(12) United States Patent
Roh et al.

(10) Patent No.: US 9,184,888 B2
(45) Date of Patent: *Nov. 10, 2015

(54) METHOD OF RESOURCE BLOCK (RB) BUNDLING

(71) Applicant: LG ELECTRONICS INC., Seoul (KR)

(72) Inventors: Dongwook Roh, San Diego, CA (US);
Daewon Lee, Gyeonggi-do (KR);
Bonghoe Kim, Gyeonggi-do (KR);
Yujin Noh, Gyeonggi-do (KR);
Byeongwoo Kang, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,190

(22) Filed: Dec. 8, 2014

(65) Prior Publication Data

US 2015/0085816 A1 Mar. 26, 2015

Related U.S. Application Data

(63) Continuation of application No. 12/940,730, filed on Nov. 5, 2010, now Pat. No. 9,008,009.

(60) Provisional application No. 61/259,078, filed on Nov. 6, 2009.

(51) Int. Cl.
*H04L 12/911* (2013.01)
*H04L 1/00* (2006.01)
(Continued)

(52) U.S. Cl.
CPC ............ *H04L 5/0044* (2013.01); *H04L 1/0003* (2013.01); *H04L 1/0025* (2013.01); *H04L 1/0027* (2013.01); *H04L 5/0048* (2013.01); *H04W 72/04* (2013.01); *H04W 72/0486* (2013.01); *H04L 1/0009* (2013.01);
(Continued)

(58) Field of Classification Search
CPC ....................................................... H04W 72/04
See application file for complete search history.

(56) References Cited

U.S. PATENT DOCUMENTS

2008/0260062 A1 10/2008 Imamura
2010/0135242 A1 6/2010 Nam et al.
(Continued)

OTHER PUBLICATIONS

Qualcomm Europe, "UE-RS Patterns for LTE-A," R1-093105, 3GPP TSG-RAN WG1 #58, Aug. 2009.
(Continued)

*Primary Examiner* — Brandon Renner
(74) *Attorney, Agent, or Firm* — Lee, Hong, Degerman, Kang & Waimey

(57) ABSTRACT

A method of sizing bundled resource blocks (RBs) having at least one user equipment (UE)-specific demodulation reference signal in an orthogonal frequency division multiplexing (OFDM) system is disclosed. According to one embodiment, the method includes: receiving configuration information related to at least one UE-specific demodulation reference signal; receiving a plurality of resource blocks (RBs) from a network, wherein the plurality of resource blocks comprises the at least one UE-specific demodulation reference signal, at least one cell-specific demodulation reference signal or data, wherein a number of the plurality of RBs is dependent on a size of a system bandwidth, the size of the system bandwidth corresponding to one of four size ranges; and processing at least one of the received plurality of RBs by bundling the plurality of RBs into RB bundles, wherein the size of each RB bundle is based on the one of the four size ranges.

16 Claims, 17 Drawing Sheets

(51) Int. Cl.

| | | |
|---|---|---|
| *H04W 48/16* | (2009.01) | |
| *H04W 72/00* | (2009.01) | |
| *H04L 5/00* | (2006.01) | |
| *H04W 72/04* | (2009.01) | |
| *H04L 1/18* | (2006.01) | |
| *H04L 25/02* | (2006.01) | |
| *H04L 27/26* | (2006.01) | |
| *H04W 24/00* | (2009.01) | |
| *H04W 24/02* | (2009.01) | |

(52) U.S. Cl.
CPC ............ *H04L 1/0026* (2013.01); *H04L 1/0059* (2013.01); *H04L 1/1819* (2013.01); *H04L 5/005* (2013.01); *H04L 5/0007* (2013.01); *H04L 5/0051* (2013.01); *H04L 25/0232* (2013.01); *H04L 27/2636* (2013.01); *H04L 27/2649* (2013.01); *H04W 24/00* (2013.01); *H04W 24/02* (2013.01); *H04W 48/16* (2013.01); *H04W 72/00* (2013.01)

(56) References Cited

U.S. PATENT DOCUMENTS

| | | |
|---|---|---|
| 2011/0085508 A1 | 4/2011 | Wengerter et al. |
| 2011/0194412 A1* | 8/2011 | Park et al. ............... 370/241 |
| 2011/0205995 A1 | 8/2011 | Grovlen |
| 2011/0305211 A1 | 12/2011 | Lunttila et al. |

OTHER PUBLICATIONS

Samsung, "Codebook Design for 8 Tx Transmission in LTE-A," R1-093404, 3GPP TSG RAN WG1 Meeting #58, Aug. 2009.

Samsung, "Discussion on DM-RS for LTE-Advanced," R1-094088, 3GPP TSG RAN WG1 #58bis, Oct. 2009.

* cited by examiner

FIG. 17A
FIG. 17B
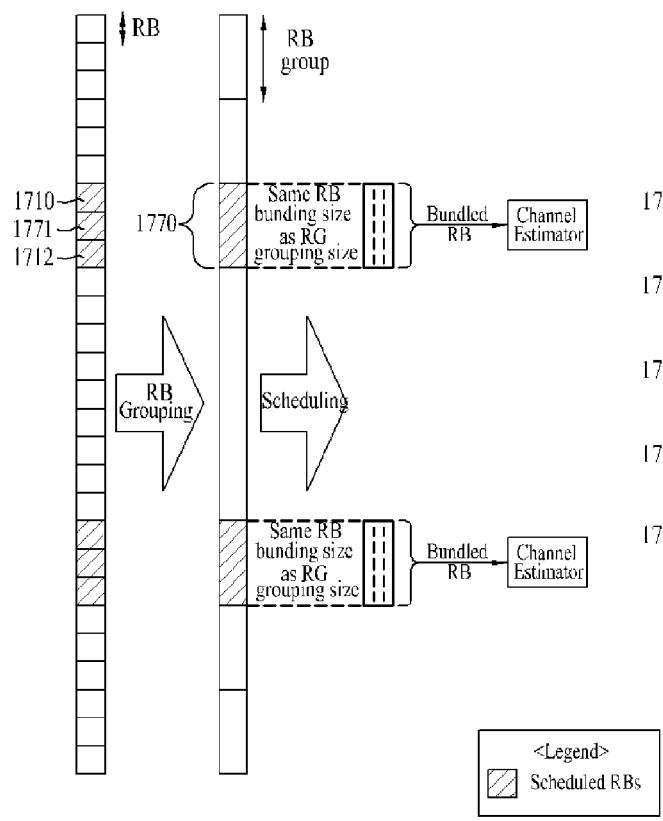
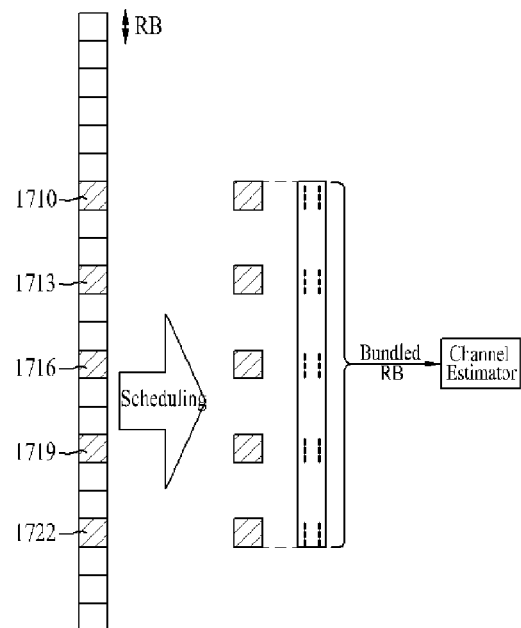

METHOD OF RESOURCE BLOCK (RB) BUNDLING

This application is a continuation of U.S. patent application Ser. No. 12/940,730, filed on Nov. 5, 2010, now U.S. Pat. No. 9,008,009, which claims the benefit of U.S. Provisional Application No. 61/259,078, filed on Nov. 6, 2009, the contents of which are all hereby incorporated by reference herein in their entirety.

BACKGROUND

1. Field

Embodiments of the present invention relate to the bundling of resource blocks (RBs) in a user equipment (UE) performing channel estimation based on a reference signal.

2. Discussion of the Related Art

The universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long term evolution (LTE) of UMTS is under development by the 3rd generation partnership project (3GPP), which standardized UMTS.

In an LTE communication system, a base station may utilize one of several antenna diversity schemes in transmitting data to a mobile terminal (or user equipment (UE)). These antenna diversity schemes correspond to the number of transmit antennas (or transmit antenna ports) used by the base station in transmitting the data to the mobile terminal. Transmissions to the mobile terminal include reference signals used for demodulation of transmitted data.

SUMMARY

Techniques, apparatuses and systems described herein can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented with a radio technology such as Universal Terrestrial Radio Access (UTRA) or CDMA2000. TDMA may be implemented with a radio technology such as Global System for Mobile communications (GSM), General Packet Radio Service (GPRS), and/or Enhanced Data Rates for GSM Evolution (EDGE). OFDMA may be implemented with a radio technology such as Institute of Electrical and Electronics Engineers (IEEE) 802.11 (Wi-Fi), IEEE 802.16 (WiMAX), IEEE 802-20, evolved-UTRA (E-UTRA), etc. UTRA is a part of a universal mobile telecommunication system (UMTS).

3rd generation partnership project (3GPP) long term evolution (LTE) is a part of an evolved-UMTS (E-UMTS) using the E-UTRA. 3GPP LTE employs OFDMA in downlink and employs SC-FDMA in uplink. LTE-advance (LTE-A) is an evolved version of 3GPP LTE. For purposes of description, particular embodiments are described herein with reference to 3GPP LTE/LTE-A. However, it is understood that embodiments of the present invention may be implemented in other contexts.

According to one embodiment, a method of sizing bundled resource blocks (RBs) having at least one user equipment (UE)-specific demodulation reference signal in an orthogonal frequency division multiplexing (OFDM) system is disclosed. The method includes: receiving configuration information related to at least one UE-specific demodulation reference signal; receiving a plurality of resource blocks (RBs) from a network, wherein the plurality of resource blocks comprises the at least one UE-specific demodulation reference signal, at least one cell-specific demodulation reference signal or data, wherein a number of the plurality of RBs is dependent on a size of a system bandwidth, the size of the system bandwidth corresponding to one of four size ranges; and processing at least one of the received plurality of RBs by bundling the plurality of RBs into RB bundles, wherein the size of each RB bundle is based on the one of the four size ranges.

According to another embodiment, a method of sizing bundled resource blocks (RBs) having at least one user equipment (UE)-specific demodulation reference signal in an orthogonal frequency division multiplexing (OFDM) system is disclosed. The method includes: transmitting configuration information related to at least one UE-specific demodulation reference signal; transmitting a plurality of resource blocks (RBs) to a user equipment (UE), wherein the plurality of resource blocks comprises the at least one UE-specific demodulation reference signal, at least one cell-specific demodulation reference signal or data, wherein a number of the plurality of RBs is dependent on a size of a system bandwidth, the size of the system bandwidth corresponding to one of four size ranges; and receiving channel condition information from the UE, wherein the channel condition information is determined by processing at least one of the received plurality of RBs by bundling the plurality of RBs into RB bundles, wherein the size of each RB bundle is based on the one of the four size ranges.

According to another embodiment, a user equipment (UE) sizing bundled resource blocks (RBs) having at least one user equipment (UE)-specific demodulation reference signal in an orthogonal frequency division multiplexing (OFDM) system is disclosed. The UE includes: an RF unit for receiving configuration information related to at least one UE-specific demodulation reference signal and receiving a plurality of resource blocks (RBs) from a network, wherein the plurality of resource blocks comprises the at least one UE-specific demodulation reference signal, at least one cell-specific demodulation reference signal or data, wherein a number of the plurality of RBs is dependent on a size of a system bandwidth, the size of the system bandwidth corresponding to one of four size ranges; and a processor for processing at least one of the received plurality of RBs by bundling the plurality of RBs into RB bundles, wherein the size of each RB bundle is based on the one of the four size ranges.

BRIEF DESCRIPTION OF THE DRAWINGS

The above and other aspects and features of the present disclosure will become more apparent upon consideration of the following description of embodiments, taken in conjunction with the accompanying drawing figures:

FIG. 17A illustrates an example of channel estimation with RB bundling according to one embodiment.

FIG. 17B illustrates an example of channel estimation with RB bundling according to one embodiment.

DETAILED DESCRIPTION

Figure 1:
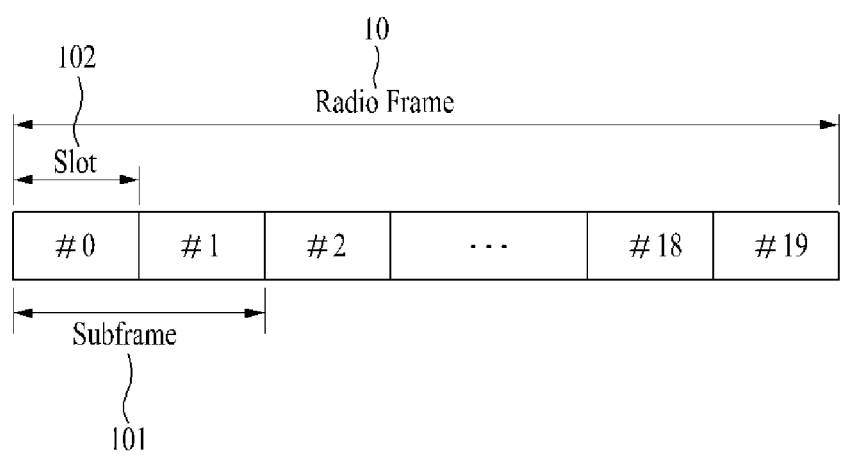
FIG. 1 is a structure of a radio frame of 3GPP LTE.

With reference to FIG. 1, a radio frame 10 according to one embodiment includes 10 subframes. A subframe 101 includes two slots 102 with respect to the time domain. A time for transmitting one subframe 101 is defined as a transmission time interval (TTI). For example, one subframe 101 may have a length of 1 millisecond (msec), and one slot 102 may have a length of 0.5 msec. One slot 102 includes a plurality of orthogonal frequency division multiplexing (OFDM) symbols with respect to the time domain (see, e.g., downlink slot 202 of FIG. 2). Since the 3GPP LTE uses the orthogonal frequency division multiplexing access (OFDMA) in the downlink, the OFDM symbol is for representing one symbol period. The OFDM symbol may also be referred to as a single carrier frequency division multiple access (SC-FDMA) symbol or a symbol period.

Figure 2:
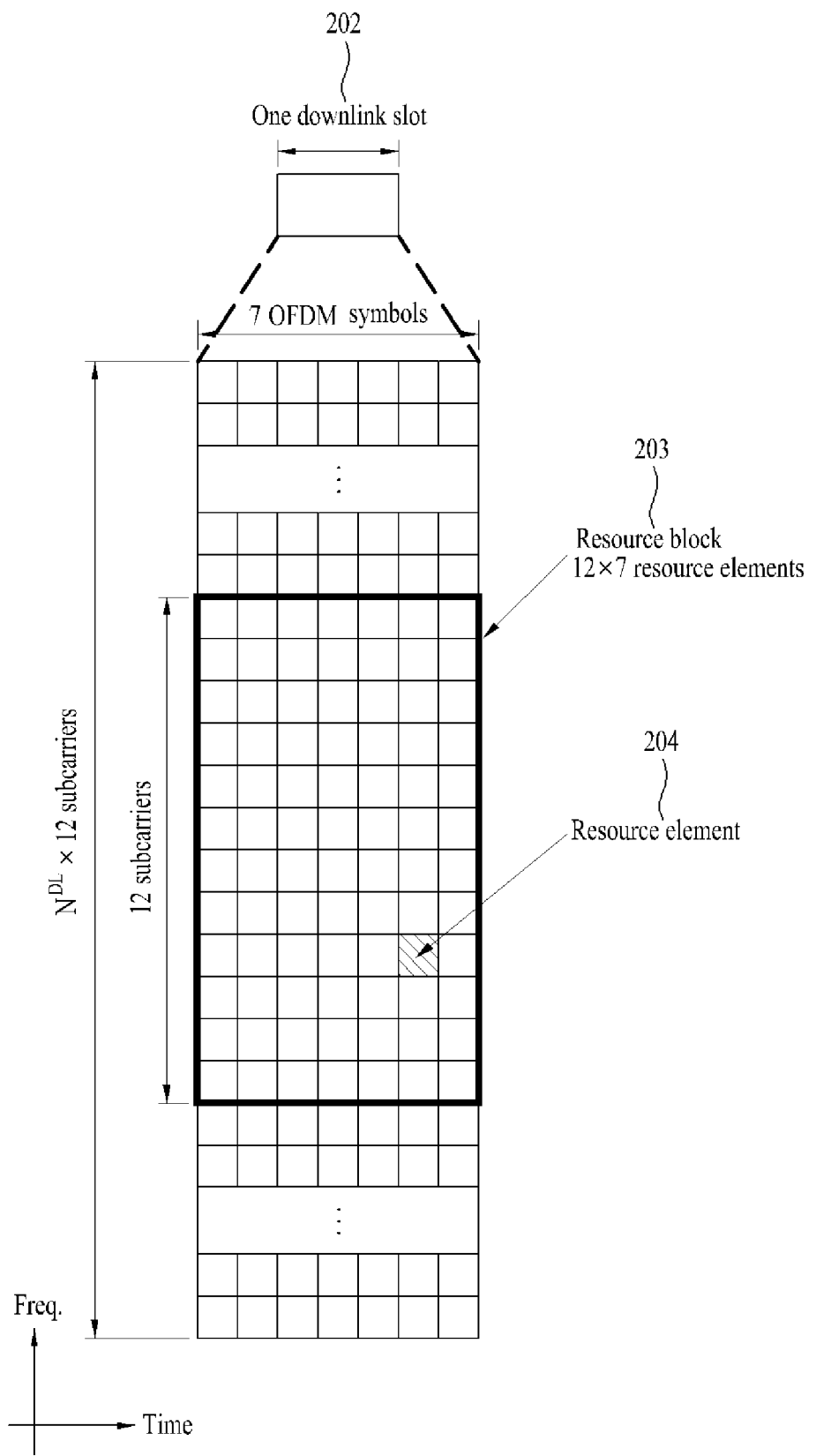
FIG. 2 illustrates a structure of a resource grid for one downlink slot.

A resource block (RB) is a resource allocation unit, and includes a plurality of contiguous subcarriers in one slot (see, e.g., resource block 203 of FIG. 2). As previously noted, FIG. 1 illustrates a radio frame according to one embodiment. It is understood that, according to other embodiments, the number of subframes included in the radio frame, the number of slots included in the subframe, and/or the number of OFDM symbols included in the slot may vary.

With reference to FIG. 2, a downlink slot 202 is illustrated according to one embodiment. The downlink slot 202 includes a plurality of OFDM symbols with respect to the time domain. The downlink slot 202 includes 7 OFDM symbols, and the RB 203 includes 12 subcarriers with respect to the frequency domain. It is understood that, according to other embodiments, the size and/or structure of the downlink slot 202 and the RB 203 may vary. Each element on the resource grid is referred to as a resource element (e.g., resource element 204). The RB 203 includes 12×7 resource elements 204. The number of RBs ($N^{DL}$) included in the downlink slot 202 depends on a downlink transmit bandwidth. The structure of an uplink slot may be the same as that of the downlink slot 202.

Figure 3:
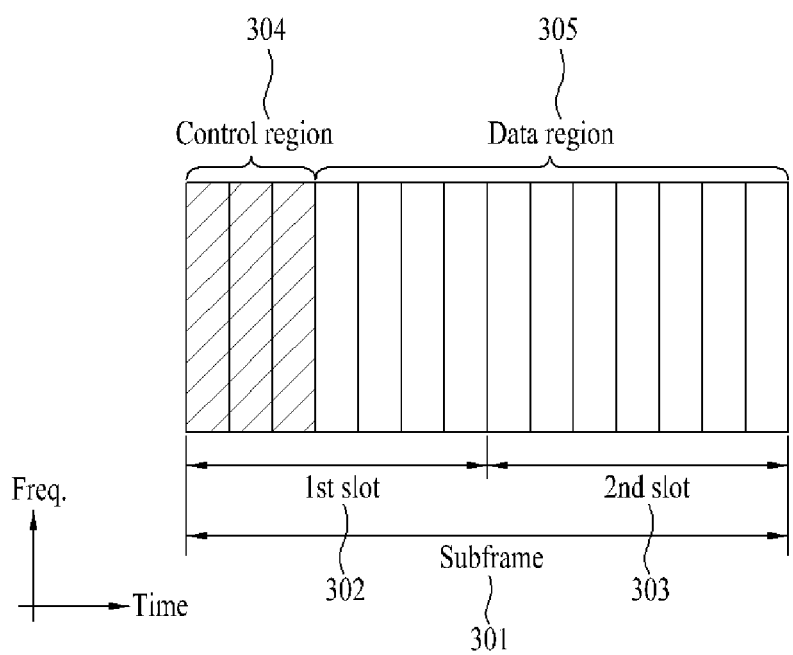
FIG. 3 illustrates a structure of a downlink subframe.

With reference to FIG. 3, a downlink subframe 301 is illustrated according to one embodiment. The subframe 301 includes a first slot 302 and a second slot 303. With respect to the first slot 302, the first three OFDM symbols correspond to a control region 304 to be assigned to a control channel—i.e., a downlink control channel. According to one embodiment, a maximum of three OFDM symbols located in a front portion of the first slot 302 within the subframe 301 corresponds to a control region to be assigned to a control channel. The remaining OFDM symbols correspond to a data region 305 to be assigned to a physical downlink shared channel (PDSCH).

Examples of downlink control channels used in the 3GPP LTE include a physical control format indicator channel (PCFICH), a physical downlink control channel (PDCCH), a physical hybrid automatic repeat request (ARQ) indicator channel (PHICH), etc. The PCFICH is transmitted at a first OFDM symbol of a subframe (e.g., subframe 301 of FIG. 3) and carries information regarding the number of OFDM symbols used for transmission of control channels within the subframe. The PHICH is a response to an uplink transmission and carries a hybrid automatic repeat request (HARQ) acknowledgment (ACK)/non-acknowledgment (NACK) signal. Control information transmitted through the PDCCH is referred to as downlink control information (DCI). The DCI includes uplink or downlink scheduling information or includes an uplink transmit (Tx) power control command for arbitrary user equipment (UE) groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region (e.g., control region 304 of FIG. 3). The UE can monitor the plurality of PDCCHs.

The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs. The base station (BS) determines a PDCCH format according to a DCI to be transmitted to the UE, and attaches a cyclic redundancy check (CRC) to the control information.

The CRC is masked with a unique identifier (referred to as a radio network temporary identifier (RNTI)) according to an owner or usage of the PDCCH. If the PDCCH is for a specific UE, a unique identifier (e.g., a cell-RNTI (C-RNTI)) of the UE may be masked to the CRC. Alternatively, if the PDCCH is for a paging message, a paging indicator identifier (e.g., a paging-RNTI (P-RNTI)) may be masked to the CRC. If the PDCCH is for system information (e.g., a system information block (SIB), as will be described in more detail below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
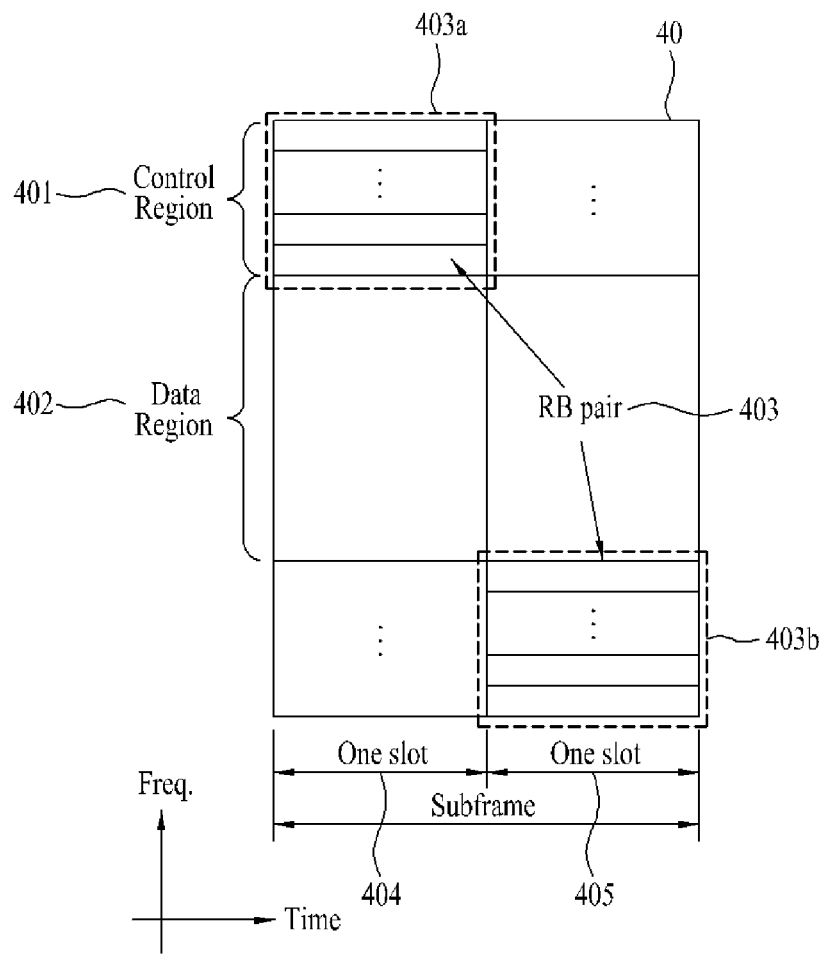
FIG. 4 illustrates a structure of an uplink subframe.

With reference to FIG. 4, an uplink subframe 40 can be divided with respect to a frequency domain into a control region 401 and a data region 402. The control region 401 is allocated to a physical uplink control channel (PUCCH) for carrying uplink control information. The data region 402 is allocated to a physical uplink shared channel (PUSCH) for carrying user data. To maintain a single carrier property, one UE (i.e., a given UE) does not simultaneously transmit the PUCCH and the PUSCH. The PUCCH for a given UE is allocated an RB pair 403 (i.e., RBs 403a and 403b) in the subframe 40. The RBs 403a and 403b belonging to the RB pair 403 occupy different subcarriers in their respective slots (slots 404, 405). In other words, the RB pair allocated to the PUCCH is frequency-hopped in a slot boundary.

Figure 5:
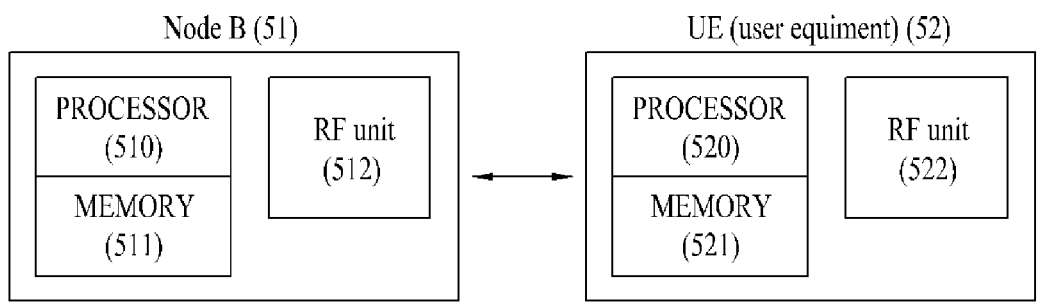
FIG. 5 is a block diagram of a system for implementing embodiments of the present invention.

With reference to FIG. 5, a wireless communication system includes a NodeB (or Base Station) 51 and one or more UEs 52. To facilitate a downlink, a transmitter may be provided in the NodeB 51, and a receiver may be provided in the UE 52. To facilitate an uplink, a transmitter may be provided in the UE 52, and a receiver may be provided in the NodeB 51.

With continued reference to FIG. 5, the NodeB 51 may include a processor 510, a memory 511, and a radio frequency (RF) unit 512. The processor 510 may be configured to implement features, procedures and/or methods described herein with reference to various embodiments. The memory 511 is coupled with the processor 510 and stores a variety of information for operating the processor 510. The RF unit 512 is coupled with the processor 510 and transmits and/or receives a radio signal.

The UE 52 may include a processor 520, a memory 521, and an RF unit 522. The processor 520 may be configured to implement features, procedures and/or methods described herein with reference to various embodiments. The memory 521 is coupled with the processor 520 and stores a variety of information for operating the processor 520. The RF unit 522 is coupled with the processor 521 and transmits and/or receives a radio signal.

The NodeB 51 and/or the UE 52 may have a single antenna or multiple antennas. When at least one of the NodeB 10 and the UE 20 has multiple antennas, the wireless communication system may be referred to as a multiple input multiple output (MIMO) system.

A MIMO system uses multiple transmission (Tx) antennas and multiple reception (Rx) antennas to improve the efficiency of Tx/Rx data, relative to a conventional system using a single transmission (Tx) antenna and a single reception (Rx) antenna. In other words, the MIMO technology allows a transmission end or a reception end of a wireless communication system to use multiple antennas (hereinafter referred to as "multi-antenna"), so that the capacity or performance can be improved. For purposes of description, the term "MIMO" will be used to refer to a multi-antenna technology or system.

In more detail, a MIMO system is not dependent on a single antenna path to receive a single total message. Rather, the MIMO system collects a plurality of data pieces received via several antennas, and completes total data. As a result, the MIMO technology can increase a data transfer rate within a specific range, or can increase a system range at a specific data transfer rate.

MIMO technology can be applied to mobile communication technology that requires a higher data transfer rate relative to a conventional mobile communication technology. MIMO communication technology can be applied to mobile communication terminals or repeaters, for example, to extend a data communication range. As such, it can address the limited amount of transfer data often provided by other mobile communication systems.

Among a variety of technologies capable of improving the transfer efficiency of data, MIMO technology can greatly increase an amount of communication capacity and Tx/Rx performances without allocating additional frequencies or requiring additional power.

Figure 6:
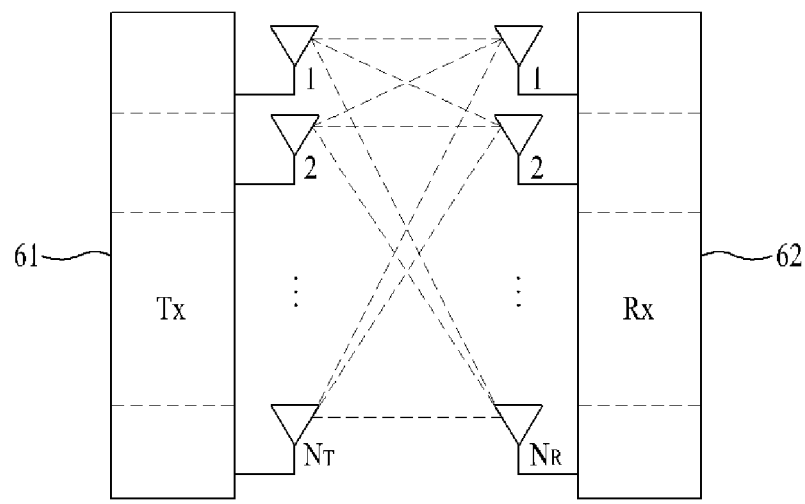
FIG. 6 illustrates a modeling of a MIMO system.

With reference to FIG. 6, a block diagram of a MIMO system is illustrated. The transmitter 61 has a number of transmission (Tx) antennas. The receiver 62 has a number of reception (Rx) antennas. If the number of transmission (Tx) antennas is increased to $N_T$ and the number of reception (Rx) antennas is increased to $N_R$, a theoretical channel transmission capacity of the MIMO communication system increases in proportion to the number of antennas. Relative to a previously existing system in which only a transmitter or only a receiver uses several antennas, a transfer rate and a frequency efficiency of a MIMO system (such as the system illustrated in FIG. 6) may be greatly increased.

Regarding such a MIMO system, the transfer rate obtained by the increasing channel transmission capacity is equal to the multiplication of a rate increment ($R_i$) and a maximum transfer rate ($R_o$) that is obtained when a single antenna is used. The rate increment ($R_i$) can be expressed according to Equation 1 below.

$$R_i = \min(N_T, N_R) \quad \text{[Equation 1]}$$

A mathematical modeling of a usage of the above-mentioned MIMO system will now be described in more detail. As explained with reference to FIG. 6, the system has $N_T$ Tx antennas and $N_R$ Rx antennas. In the case of a transmission (Tx) signal, a maximum number of pieces of transmission information is $N_T$ under the condition that $N_T$ Tx antennas are used, so that the Tx signal can be represented as a vector as shown in Equation 2 below.

$$S = [S_1, S_2, \ldots, S_{N_T}]^T \quad \text{[Equation 2]}$$

Individual transmission information pieces ($s_1, s_2, \ldots, s_{N_T}$) may have different transmission powers relative to one another. In this case, if the individual transmission powers are denoted by ($P_1, P_2, \ldots, P_{N_T}$), transmission information having an adjusted transmission power can be represented as a vector as shown in Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, $\hat{s}$ is a diagonal matrix of a transmission power, and can be represented by Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector $\hat{s}$ having an adjusted transmission power is multiplied by a weight matrix (W), so that $N_T$ transmission (Tx) signals ($x_1, x_2, \ldots, x_{N_T}$) to be transmitted are configured. In this case, the weight matrix (or precoding matrix) is adapted to properly distribute Tx information to individual antennas according to Tx-channel situations. The above-mentioned Tx signals ($x_1, x_2, \ldots, x_{N_T}$) can be represented by Equation 5 below using the vector (x).

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$
$$= WPs$$

In Equation 5, $w_{ij}$ is a weight between the i-th Tx antenna and the j-th Tx information, and W is a matrix indicating the weights wij. The matrix W is referred to as a weight matrix or a precoding matrix. The above-mentioned Tx signal (x) can be considered in different ways according to two configurations, i.e., a first configuration in which spatial diversity is used and a second configuration in which spatial multiplexing is used. When spatial multiplexing is used, different signals are multiplexed together, and the multiplexed signals are transmitted to a destination, so that elements of the information vector (s) have different values. When spatial diversity is used, the same signal is repeatedly transmitted via several channel paths, so that elements of the information vector (s) have the same value.

It is understood that a combination of the spatial multiplexing scheme and the spatial diversity scheme may also be considered. For example, the same signal may be transmitted via three Tx antennas according to the spatial diversity scheme, and the remaining signals are spatially multiplexed and then transmitted to a destination.

Regarding the receiver end, if $N_R$ Rx antennas are used in the MIMO system of FIG. 6, Rx signals ($y_1, y_2, \ldots, y_{N_R}$) of the individual antennas can be represented as a specific vector (y) as shown in Equation 6 below.

$$y = [y_1, y_2, \ldots, y_{N_R}]^T \quad \text{[Equation 6]}$$

In modeling channels of the MIMO communication system, individual channels can be distinguished from each other according to Tx/Rx antenna indexes. A specific channel passing from a Tx antenna (j) to an Rx antenna (i) is denoted as $h_{ij}$. Multiple channels that are associated with each other (see, e.g., FIG. 7) may be represented in the form of a vector or matrix.

Figure 7:
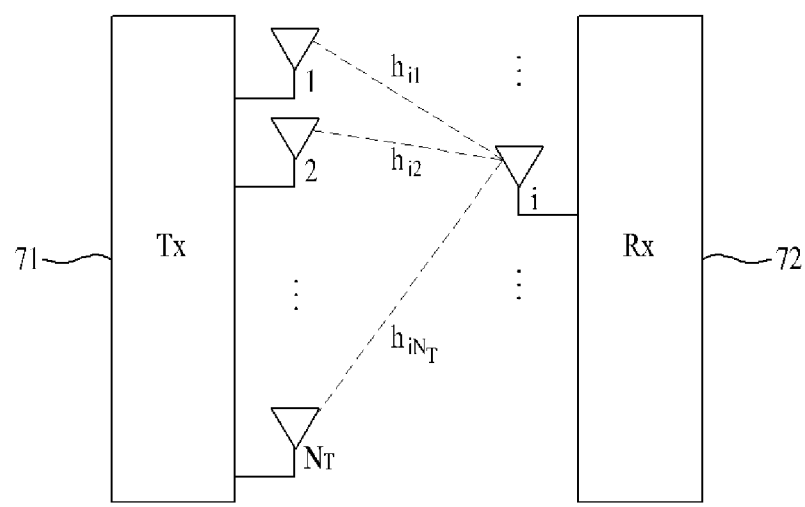
FIG. 7 illustrates a modeling of a MIMO system.

With reference to FIG. 7, $N_T$ channels are shown, each of the channels passing from a respective Tx antenna to an Rx antenna (i). The channels passing from the respective Tx antennas to the Rx antenna (i) can be represented using Equation 7 below.

$$h_i^T = [h_{i1}, h_{i2}, \ldots, h_{iN_T}] \quad \text{[Equation 7]}$$

If all channels passing from the $N_T$ Tx antennas to the $N_R$ Rx antennas are denoted using the matrix shown in Equation 7, then the channel matrix of Equation 8 below may be obtained.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

In modeling the channels, an Additive White Gaussian Noise (AWGN) may be added to a signal which passes through the channel matrix H shown in Equation 8. The AWGN ($n_1, n_2, \ldots, n_{N_R}$) added to the signals received at each of the $N_R$ Rx antennas can be represented as a specific vector as shown in Equation 9 below.

$$n = [n_1, n_2, \ldots, n_{N_R}]^T \quad \text{[Equation 9]}$$

According to the above-described modeling method of the Tx signal, the Rx signal, and the AWGN, the MIMO communication system can be represented by Equation 10 below.

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The number of rows and the number of columns of a channel matrix H indicating a channel condition is determined by the number of Tx/Rx antennas. In the channel matrix H, the number of rows is equal to the number ($N_R$) of Rx antennas, and the number of columns is equal to the number ($N_T$) of Tx antennas. As such, the channel matrix H is an $N_R \times N_T$ matrix.

Generally, a matrix rank is defined by the smaller of the number of rows and the number of columns, where the rows and the columns are independent of each other. Therefore, the matrix rank cannot be higher than the number of rows or columns. The rank of the channel matrix H can be represented by Equation 11 below.

$$\text{rank}(H) \leq \min(N_T, N_R) \quad \text{[Equation 11]}$$

Now, the precoding matrix will be described in more detail. First, as previously described, the channel matrix H (i.e., the matrix without taking into account the precoding matrix) can be represented as shown in Equation 12 below.

$$H = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}$$ [Equation 12]

$$= [h_1 \ h_2 \ \cdots \ h_{N_T}]$$

In general, a k-th received SINR (Signal to Interference Noise Ratio) $\rho_k$ is defined according to Equation 13 below if the receiver uses a minimum mean square error (MMSE) estimator, i.e., if the receiver is an MMSE receiver.

$$\rho_k = SINR_k = h_k^H \left( N_0 I_{N_R} + \sum_{\substack{i=1 \\ i \neq k}}^{N_R} h_i h_i^H \right)^{-1} h_k$$ [Equation 13]

The effective channel matrix $\tilde{H}$ which takes into account the precoding matrix W can be represented according to Equation 14 below.

$$\tilde{H} = HW$$ [Equation 14]

$$= \begin{bmatrix} \vec{h}_1^T \\ \vec{h}_1^T \\ \vdots \\ \vec{h}_{N_R}^T \end{bmatrix} [w_1 \ w_2 \ \cdots \ w_{N_R}]$$

$$= \begin{bmatrix} \vec{h}_1^T w_1 & \vec{h}_1^T w_2 & \cdots & \vec{h}_1^T w_{N_R} \\ \vec{h}_2^T w_1 & \vec{h}_2^T w_2 & \cdots & \vec{h}_2^T w_{N_R} \\ \vdots & \vdots & \vdots & \vdots \\ \vec{h}_{N_R}^T w_1 & \vec{h}_{N_R}^T w_2 & \cdots & \vec{h}_{N_R}^T w_{N_R} \end{bmatrix}$$

$$= [\tilde{h}_1 \ \tilde{h}_2 \ \cdots \ \tilde{h}_{N_T}]$$

Therefore, the k-th effective received SINR $\tilde{\rho}_k$ is defined according to Equation 15 below if it is assumed that the MMSE receiver is used.

$$\tilde{\rho}_k = SINR_k$$ [Equation 15]

$$= \tilde{h}_k^H \left( N_0 I_{N_R} + \sum_{\substack{i=1 \\ i \neq k}}^{N_R} \tilde{h}_i \tilde{h}_i^H \right)^{-1} \tilde{h}_k$$

$$= [w_k^H \vec{h}_1^* \ w_k^H \vec{h}_2^* \ \cdots \ w_k^H \vec{h}_{N_R}^*] \left( N_0 I_{N_R} + \sum_{\substack{i=1 \\ i \neq k}}^{N_R} \tilde{h}_i \tilde{h}_i^H \right)^{-1} \begin{bmatrix} \vec{h}_1^T w_k \\ \vec{h}_2^T w_k \\ \vdots \\ \vec{h}_{N_R}^T w_k \end{bmatrix}$$

Here, based on theoretical notions, we can observe some effectiveness on the received SNR depending on variations of the precoding matrix. First, we can check on an effectiveness of permutating columns in one precoding matrix. Via a permutation between the i-th column vector $w_i$ and the j-th column vector $w_j$, a permutated precoding matrix $\hat{W}$ can be represented according to Equation 16 below.

$$W = [w_1 \ \ldots \ w_i \ \ldots \ w_j \ \ldots \ w_{N_R}]$$

$$\hat{W} = [w_1 \ \ldots \ w_j \ \ldots \ w_i \ \ldots \ w_{N_R}]$$ [Equation 16]

The effective channel $\tilde{H}$ with precoding matrix W and the permutated effective channel $\hat{H}$ with precoding matrix $\hat{W}$ can be represented according to Equation 17 below.

$$\tilde{H} = HW$$ [Equation 17]

$$= \begin{bmatrix} \vec{h}_1^T \\ \vec{h}_1^T \\ \vdots \\ \vec{h}_{N_R}^T \end{bmatrix} [w_1 \ \ldots \ w_i \ \ldots \ w_j \ \ldots \ w_{N_R}]$$

$$= \begin{bmatrix} \vec{h}_1^T w_1 & \cdots & \vec{h}_1^T w_i & \cdots & \vec{h}_1^T w_j & \cdots & \vec{h}_1^T w_{N_T} \\ \vec{h}_2^T w_1 & \cdots & \vec{h}_2^T w_i & \cdots & \vec{h}_2^T w_j & \cdots & \vec{h}_2^T w_{N_T} \\ \vdots & \vdots & \vdots & \vdots & \vdots & \vdots & \vdots \\ \vec{h}_{N_R}^T w_1 & \cdots & \vec{h}_{N_R}^T w_i & \cdots & \vec{h}_{N_R}^T w_j & \cdots & \vec{h}_{N_R}^T w_{N_T} \end{bmatrix}$$

$$= [\tilde{h}_1 \ \ldots \ \tilde{h}_i \ \ldots \ \tilde{h}_j \ \ldots \ \tilde{h}_{N_T}]$$

$$\hat{H} = H\hat{W}$$

$$= \begin{bmatrix} \vec{h}_1^T \\ \vec{h}_1^T \\ \vdots \\ \vec{h}_{N_R}^T \end{bmatrix} [w_1 \ \ldots \ w_j \ \ldots \ w_i \ \ldots \ w_{N_R}]$$

$$= \begin{bmatrix} \vec{h}_1^T w_1 & \cdots & \vec{h}_1^T w_j & \cdots & \vec{h}_1^T w_i & \cdots & \vec{h}_1^T w_{N_T} \\ \vec{h}_2^T w_1 & \cdots & \vec{h}_2^T w_j & \cdots & \vec{h}_2^T w_i & \cdots & \vec{h}_2^T w_{N_T} \\ \vdots & \vdots & \vdots & \vdots & \vdots & \vdots & \vdots \\ \vec{h}_{N_R}^T w_1 & \cdots & \vec{h}_{N_R}^T w_j & \cdots & \vec{h}_{N_R}^T w_i & \cdots & \vec{h}_{N_R}^T w_{N_T} \end{bmatrix}$$

$$= [\tilde{h}_1 \ \ldots \ \tilde{h}_j \ \ldots \ \tilde{h}_i \ \ldots \ \tilde{h}_{N_T}]$$

Based on Equation 17, even if two column vectors are permutated, the received SINR value itself is not changed (except as to order) such that the channel capacity/sum rate is constant. Similar to Equations 14 and 15, the permutated effective channel and the k-th received SINR $\hat{\rho}_k$ can be respectively determined according to Equations 18 and 19 below.

$$\hat{H} = H\hat{W} \quad \text{[Equation 18]}$$

$$= \begin{bmatrix} \vec{h}_1^T \\ \vec{h}_1^T \\ \vdots \\ \vec{h}_{N_R}^T \end{bmatrix} \begin{bmatrix} \hat{w}_1 & \hat{w}_2 & \cdots & \hat{w}_{N_R} \end{bmatrix}$$

$$= \begin{bmatrix} \vec{h}_1^T \hat{w}_1 & \vec{h}_1^T \hat{w}_2 & \cdots & \vec{h}_1^T \hat{w}_{N_R} \\ \vec{h}_2^T \hat{w}_1 & \vec{h}_2^T \hat{w}_2 & \cdots & \vec{h}_2^T \hat{w}_{N_R} \\ \vdots & \vdots & \vdots & \vdots \\ \vec{h}_{N_R}^T \hat{w}_1 & \vec{h}_{N_R}^T \hat{w}_2 & \cdots & \vec{h}_{N_R}^T \hat{w}_{N_R} \end{bmatrix}$$

$$= \begin{bmatrix} \hat{h}_1 & \hat{h}_2 & \cdots & \hat{h}_{N_T} \end{bmatrix}$$

$$\hat{\rho}_k = SINR_k = \hat{h}_k^H \left( N_0 I_{N_R} + \sum_{\substack{i=1 \\ i \neq k}}^{N_R} \hat{h}_i \hat{h}_i^H \right)^{-1} \hat{h}_k \quad \text{[Equation 19]}$$

Based on Equation 19, the interference and noise parts (or contributions) can be expressed according to Equation 20 below.

$$\left( N_0 I_{N_R} + \sum_{\substack{i=1 \\ i \neq k}}^{N_R} \hat{h}_i \hat{h}_i^H \right)^{-1} = \begin{bmatrix} a_{11}^k & a_{12}^k & \cdots & a_{1N_R}^k \\ a_{21}^k & a_{22}^k & \cdots & a_{2N_R}^k \\ \vdots & \vdots & \vdots & \vdots \\ a_{N_R 1}^k & a_{N_R 2}^k & \cdots & a_{N_R N_R}^k \end{bmatrix} \quad \text{[Equation 20]}$$

The newly received SINR $\tilde{\rho}_k$ can be represented according to Equation 21 below.

$$\hat{\rho}_k = SINR_k \quad \text{[Equation 21]}$$

$$= \hat{h}_k^H \left( N_0 I_{N_R} + \sum_{\substack{i=1 \\ i \neq k}}^{N_R} \hat{h}_i \hat{h}_i^H \right)^{-1} \hat{h}_k$$

$$= \hat{h}_k^H \begin{bmatrix} a_{11}^k & a_{12}^k & \cdots & a_{1N_R}^k \\ a_{21}^k & a_{22}^k & \cdots & a_{2N_R}^k \\ \vdots & \vdots & \vdots & \vdots \\ a_{N_R 1}^k & a_{N_R 2}^k & \cdots & a_{N_R N_R}^k \end{bmatrix} \hat{h}_k$$

$$= \sum_{i=1}^{N_R} \sum_{j=1}^{N_R} \hat{w}_k \vec{h}_i^* \times a_{ij} \times \vec{h}_j^T \hat{w}_k$$

Also, we can check on the effectiveness of multiplexing $e^{-j\theta}$ ($0 \leq \theta \leq 2\pi$) to a specific column vector in one precoding matrix. Simply $\pm 1, \pm j$ can be possible values, for example. $\tilde{W}_k$ where $e^{-j\theta}$ is multiplexed to the k-th column of the permutated precoding matrix $\hat{W}$ can be represented according to Equation 22 below.

$$\tilde{w}_k = e^{-j\theta} \hat{w}_k \quad \text{[Equation 22]}$$

Here, the received SINR $\tilde{\rho}_k$ can be represented according to Equation 23 below.

$$\tilde{\rho}_k = \sum_{i=1}^{N_R} \sum_{j=1}^{N_R} \tilde{w}_k \vec{h}_i^* \times a_{ij} \times \vec{h}_j^T \tilde{w}_k \quad \text{[Equation 23]}$$

$$= \sum_{i=1}^{N_R} \sum_{j=1}^{N_R} e^{+j\theta} \hat{w}_k \vec{h}_i^* \times a_{ij} \times \vec{h}_j^T e^{-j\theta} \hat{w}_k$$

$$= \sum_{i=1}^{N_R} \sum_{j=1}^{N_R} \hat{w}_k \vec{h}_i^* \times a_{ij} \times \vec{h}_j^T \hat{w}_k$$

$$= \hat{\rho}_k$$

According to Equation 23, multiplexing $e^{-j\theta}$ to a specific column vector in the precoding matrix does not affect the received SINR and channel capacity/sum rate.

Figure 8:
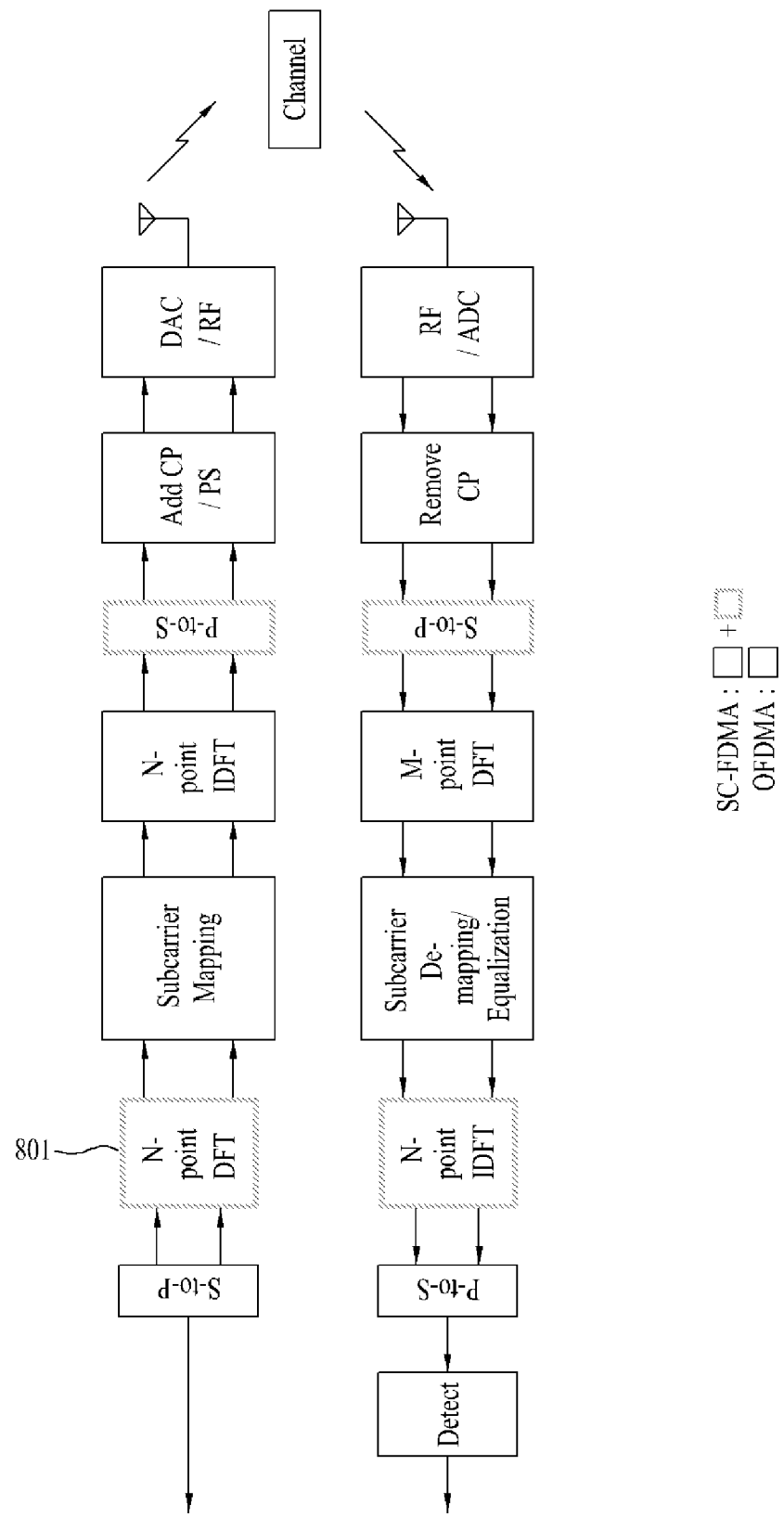
FIG. 8 is a block diagram of a system for implementing SC-FDMA and OFDMA.

In general, in a multi-Input multi-output (MIMO) antenna system based on OFDM (Orthogonal Frequency Division Multiplexing) or SC-FDMA (Single Carrier-Frequency Division Multiple Access), the data signal goes through complex mapping relations within a transmission symbol. First, the data to be transmitted are separated into codewords. For most applications, the codeword will be equivalent to a transport block given by the MAC (Medium Access Control) layer. Each codeword is encoded separately using a channel code such as Turbo Code or Tail biting convolutional code. After encoding and rate matching to appropriate sizes, the codeword is then mapped to 'layers'. Referring to FIG. 8, for an SC-FDMA transmission DFT (Discrete Fourier Transform), precoding is performed for each layer (see, for example, DFT 801), and, for OFDM transmission, no DFT transform is applied. Then, the DFT transformed signal in each layer is multiplied by the precoding vector/matrix and mapped to transmission antenna ports. Note that the transmission antenna ports can be once again mapped to actual physical antennas by means of antenna virtualization.

In general, the cubic metric (CM) of a single carrier signal (such as SC-FDMA transmission signals) is much lower than that of multi carrier signals. This general concept also applies to peak power to average power ratios (PAPR). Both CM and PAPR are related to the dynamic range which the power amplifier (PA) of the transmitter must support. Under the same PA, any transmission signal which has a lower CM or PAPR than some other form of signal can be transmitted at a higher transmit power. Conversely, if the PA's maximum power is fixed and the transmitter wants to send a high CM or PAPR signal, then it must reduce the transmit power slightly more than the situation involving a low CM signal. The reason why a single carrier signal has a lower CM than multi-carrier signals is that, in multi-carrier signals, multiple signals overlap and sometimes result in co-phase addition of signals. This possibility can lead to a large signal amplitude. This is why an OFDM system has large PAPR or CM values.

If a resulting signal y only consists of information symbol x1, then this signal can be considered as a single carrier signal (e.g., y=x1). But, if the resulting signal y consists of multiple information symbols x1, x2, x3, . . . , xN, then the signal can be considered as a multi-carrier signal such as y=x1+x2+x3+ . . . +xN. The PAPR or CM is proportional to the number of information symbols coherently added together in the resulting signal waveform, but the values tend to saturate after a certain number of information symbols are added together. So, if the resulting signal waveform is created by the addition of relatively few single carrier signals, then the CM or PAPR would be much lower than multi-carrier signals but slightly higher than a pure single carrier signal.

Figure 9:
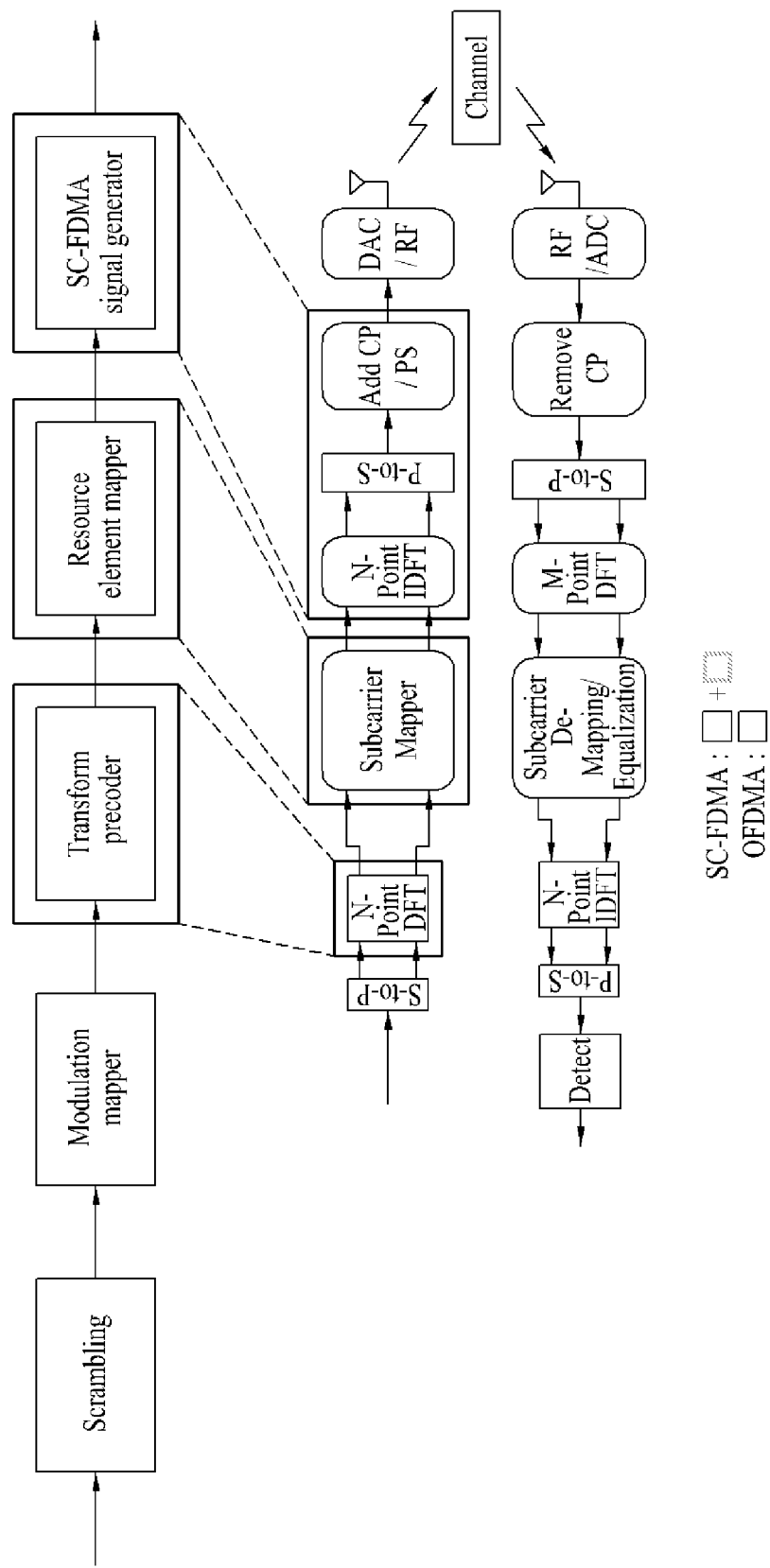
FIG. 9 is a block diagram of a system for implementing Uplink SC-FDMA.
Figure 10:
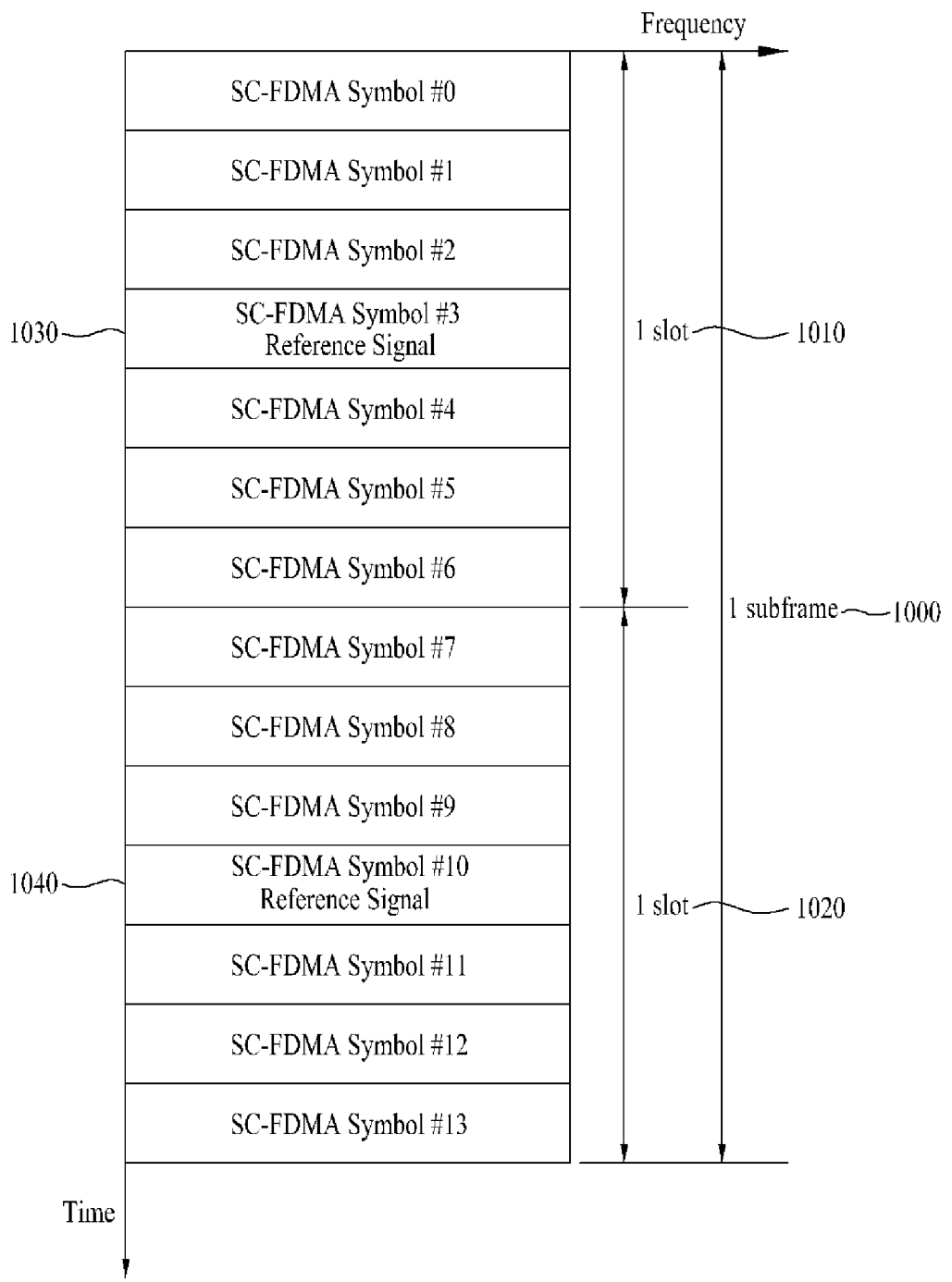
FIG. 10 illustrates a structure of an uplink SC-FDMA transmission frame.

In Rel-8 LTE, a system structure and a transmission frame for the uplink SC-FDMA are shown in FIG. 9 and FIG. 10, respectively. With reference to FIG. 10, the basic transmission unit is a subframe 1000. Two slots 1010, 1020 make up subframe 1000, and, depending on a Cyclic Prefix (CP) configuration (e.g. Normal CP or Extended CP), the number of SC-FDMA symbols in a slot is 7 or 6. In each slot 1010, 1020, there is at least 1 reference signal SC-FDMA symbol 1030, 1040, which is not used for data transmission. Within a single SC-FDMA symbol, there are multiple subcarriers. A Resource Element (RE) is a complex information symbol mapped to a single subcarrier. If DFT transform precoding is used, the RE is the single information symbol mapped to a DFT transform index since DFT transform size and the number of subcarriers used in transmission is the same for SC-FDMA.

In an LTE-advanced system, spatial multiplexing of up to four layers is considered for the uplink transmission. In the uplink using single user spatial multiplexing, up to two transport blocks can be transmitted from a scheduled terminal in a subframe per uplink component carrier. Depending on the number of transmission layers, the modulation symbols associated with each of the transport blocks are mapped onto one or two layers according to the same principle as Rel-8 LTE downlink spatial multiplexing. Moreover, DFT-precoded OFDM is adopted as the multiple access scheme for uplink data transmission both in absence and presence of spatial multiplexing. In the case of multiple component carriers, there is one DFT per component carrier. In LTE-advanced, in particular, both frequency-contiguous and frequency-non-contiguous resource allocation are supported on each component carrier.

Figure 11:
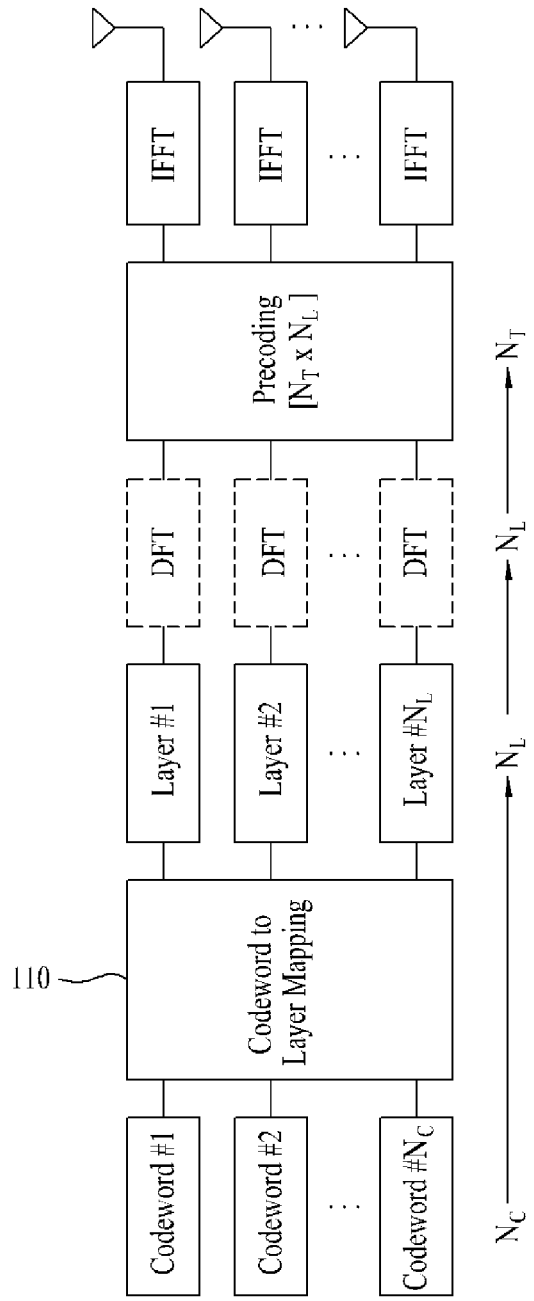
FIG. 11 illustrates an example of data signal mapping for a MIMO system based on SC-FDMA or OFDM.

FIG. 11 depicts an example of data signal mapping relation for a MIMO system based on the SC-FDMA transmission. If the number of codewords is NC, and the number of layers is NL, NC number of information symbols or multiples of NC number of information symbols will be mapped to NL number of symbols or multiples of NL (see, for example, mapping 1100). DFT transform precoding for SC-FDMA does not change the size of the layer. When precoding is performed to layers, the number of information symbols will change from NL to NT, by the NT by NL matrix multiplication. Generally the transmission 'rank' of the spatially multiplexed data is equal to the number of layers conveying data in a given transmission instant (NL, for example).

LTE (Long Term Evolution) and LTEA (Long Term Evolution Advanced)

In general, LTE (Long Term Evolution) refers to the evolved version of UMTS, or E-UMTS in the 3GPP (3rd Generation Partnership Project). The development of UMTS specifications in 3GPP is classified by its release number. For example, Release 99 indicates the WCDMA (Wideband Code Division Multiple Access) standard which consists of specifications with the number starting with TS (Technical Specification) 25.XXX. As the WCDMA specification grows, its release number also increases to Release 4 and Release 5 and so on. LTE may be considered as a quantum jump from WCDMA: some features may not be backward compatible with WCDMA. Accordingly, the specification number of LTE starts with TS 36.XXX and not TS 25.XXX. In addition, LTE has its own release number—i.e., 8. Since LTE will likely evolve as time progresses, its release number will increase from 8 to a larger number. Due to the increased demand for enhanced features, an upgraded version of LTE was introduced, e.g., release number 10 or higher, which is also referred to as LTEA (Long Term Evolution Advanced).

Hereinafter, LTE refers to the standards of release 8 or 9 in 3GPP E-UMTS, and LTEA refers to the standards of release 10 or later in 3GPP E-UMTS.

Since the development of LTE can be categorized according to its release number, it is also possible to refer to LTEA as LTE release 10. Therefore, the term LTE release XX will be used to indicate a specific set of standards. To be more specific, LTE release 8 or later will be used to refer to all standards including LTE and LTEA. LTE release 10 or later will be used to refer to LTEA. For convenience of notation, if a strict discrimination between LTE and LTEA is not necessarily required, the term LTE can be generally used to refer to all standards starting from LTE release 8 through LTE release 10 or a later release.

RB (Resource Block)

In LTE, OFDM (Orthogonal Frequency Division Multiplexing) is adopted as an air interface technology. OFDM chops the frequency bandwidth into multiple subbands which are orthogonal to each other, i.e., subcarriers. These subcarriers are used as pipes and are distributed to several UEs to transmit data. Since OFDM provides another dimension of multiplexing UE data (i.e., in the frequency domain while a conventional communication system enables multiplexing of UE data in the time domain) a two-dimensional unit is utilized to model the resource in OFDM. For this purpose, according to one embodiment, the resource block (RB) is defined as a two-dimensional unit in both the time and the frequency domain in LTE. The RB may be considered as a minimal two-dimensional unit in the time and frequency domains. The RB spans 180 kHz in the frequency domain and 0.5 milliseconds in the time domain. In more detail, a single RB corresponds to 12 subcarriers and either 7 or 6 OFDM symbols. The number of OFDM symbols in one RB depends on the frame structure based on CP length.

RS (Reference Signal)

Communications on a wireless channel inherently experience considerable noise and interference in the transmission of data, which results in difficulties on the receiver side. To correct for errors caused by the channel, it is required for the receiver to know the channel variation(s) exactly and instantaneously (or almost instantaneously). In order to allow the receiver to determine the channel variation rather easily, a predetermined signal which is known at both the transmitter and the receiver sides may be employed. The insertion of a known signal in the transmission resource facilitates channel estimation at the receiver. However, because it occupies some portion of the resource, inserting the known signal also sacrifices, at least to some degree, the capacity of system transmission.

The predetermined known signal for channel estimation is referred to as the pilot signal, reference signal or training signal. The more information the RS carries, the more exact the channel estimation. However, increasing the information carried by the RS also brings about added sacrifice of system throughput. Therefore, the size and location of the RS should be carefully considered in view of the tradeoff between channel estimation performance and system throughput loss.

Resources in LTE have two dimensions in time and frequency domain; the RS also is located along two dimensions. In order to guarantee the minimum channel estimation performance in two dimensions, the RS is designed to be spread out along the time and frequency domain in a somewhat uniformed manner. A placement of the RS in LTE for a single-antenna configuration, a two-antenna configuration and a four-antenna configured is illustrated with reference to FIGS. 12A, 12B and 12C, respectively, with respect to various embodiments. The placement of the RS is described in more detail in co-appending U.S. application Ser. No. 12/788,750, the disclosure of which is incorporated herein by reference in its entirety.

Figure 12A:
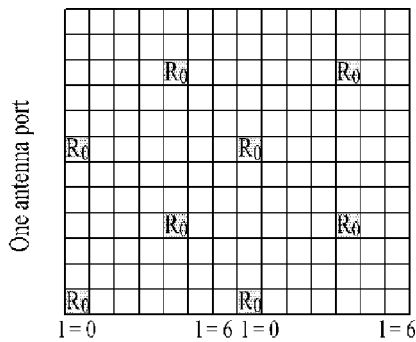
FIGS. 12A, 12B and 12C illustrate examples of mapping downlink reference signals.
Figure 12B:
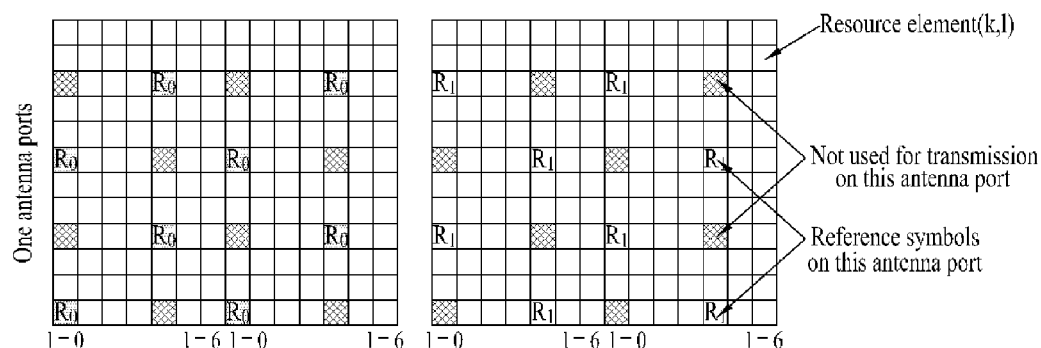
Figure 12C:
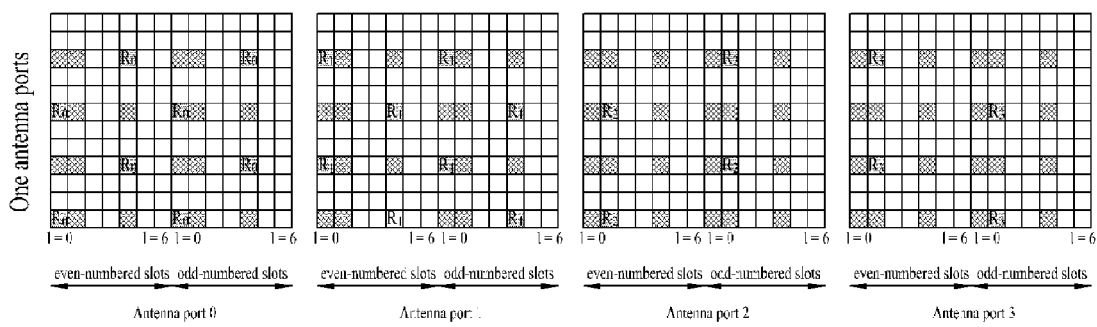

Recently, in order to support the demanding increase of throughput, MIMO technology has been intensively studied and also adopted in LTE. MIMO techniques introduce an additional dimension as a resource, which is referred to as layer, rank, or virtual antenna, for example. The additional dimension gives rise to the problem of including the RS in a MIMO transmission. Here, the RS should be carefully designed to balance the performance between spatial domains. With reference to FIGS. 12A, 12B and 12C, it is illustrated that the RS for each layer is spread out in a balanced manner (see, e.g., FIG. 12B, in which the RS for a two-antenna configuration is illustrated, and FIG. 12C, in which the RS for a four-antenna configuration is illustrated).

UE-Specific Demodulation Reference Signal

In LTE Release 8, the RS in the downlink is generated in a cell-specific manner. That is, all the UEs in a given cell should use the same RS. Using the same RS for all UEs may be quite reasonable when demodulating a common signal such as the common control signal. However, when using the RS for data demodulation, the situation could be quite different. This is because the data may be targeted for only a particular UE (e.g., one or more targeted or specific UEs) and not for all UEs in a given cell. Therefore, according to one embodiment, the RS in a data downlink is generated and transmitted for only a targeted UE. An RS configured for only a targeted (or scheduled) UE is referred to as a UE-specific RS or a UE-dedicated RS.

In LTE release 9 or later, a MIMO scheme is extended to support dual-layer beamforming or 8 transmission antennas so that additional RS is to be incorporated into the data by utilizing some resources in LTE release 8 but minimizing the impact on LTE release 8. In order to reduce or minimize the impact on the performance of LTE release 8, the amount of additional overhead for UE-specific demodulation RS should be carefully considered. The amount of the UE-specific RS cannot be reduced significantly because reducing the RS too significantly may unacceptably reduce the performance of channel estimation for data demodulation in the scheduled UE. Therefore the trade-off between the channel estimation performance for demodulation and the adverse impact on LTE release 8 legacy UEs should be carefully considered.

Figure 13:
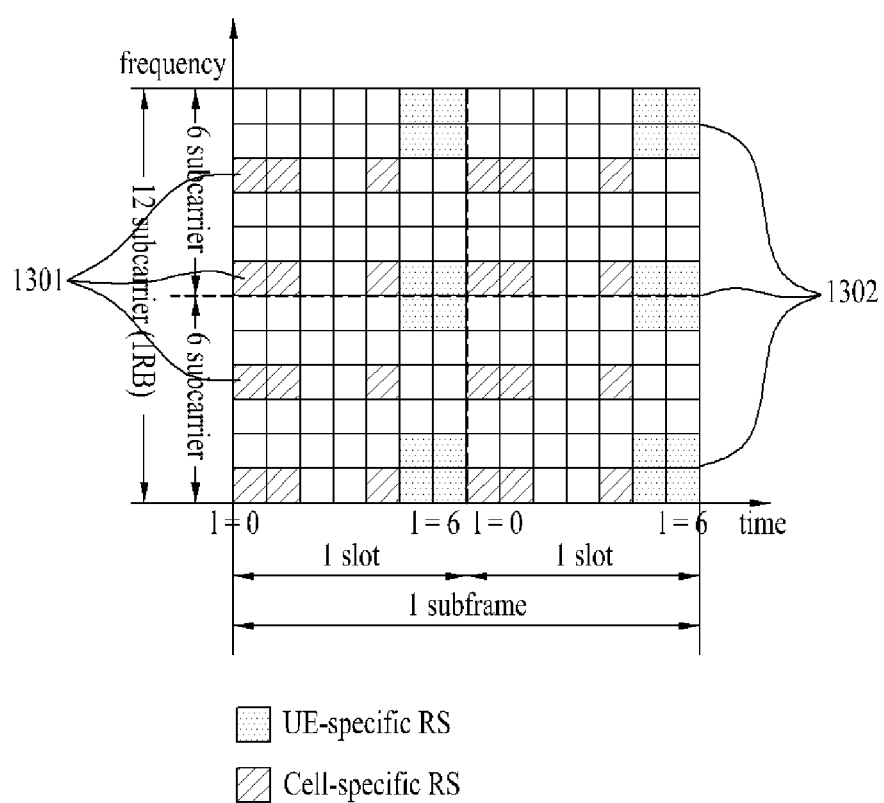
FIG. 13 illustrates an example of a mapping of a UE-specific RS.

With reference to FIG. 13, one example of the mapping of UE-specific RS in one RB is illustrated. As illustrated in FIG. 13, certain resources (e.g., resource elements 1300) are reserved for UEs of a given cell, and other resources (e.g., resource elements 1310) are reserved for one or more specific UEs in the given cell.

Bundling of Resource Blocks in UE-Specific Demodulation RS

In order to achieve adequate channel estimation accuracy by using a relatively small amount of UE-specific RS, RBs in UE-specific demodulation RS may be bundled. Under this approach, a UE can estimate a channel based on the RSs from a bundling of several contiguous RBs and not from only a single RB. The RB bundling of the RS expands the span of sampled RSs in the frequency and time domains, which provides the UE with the freedom to perform additional processing in channel estimation, which, in turn, results in better channel estimation performance. Since the bundling of continuous RBs in UE-specific demodulation RS increases the performance of channel estimation, the actual amount of RS in one RB can be reduced with the required channel estimation capability still met. Examples of channel estimation based on RS without and with bundling of RBs are illustrated in FIGS. 14A and 14B, respectively.

Figure 14A:
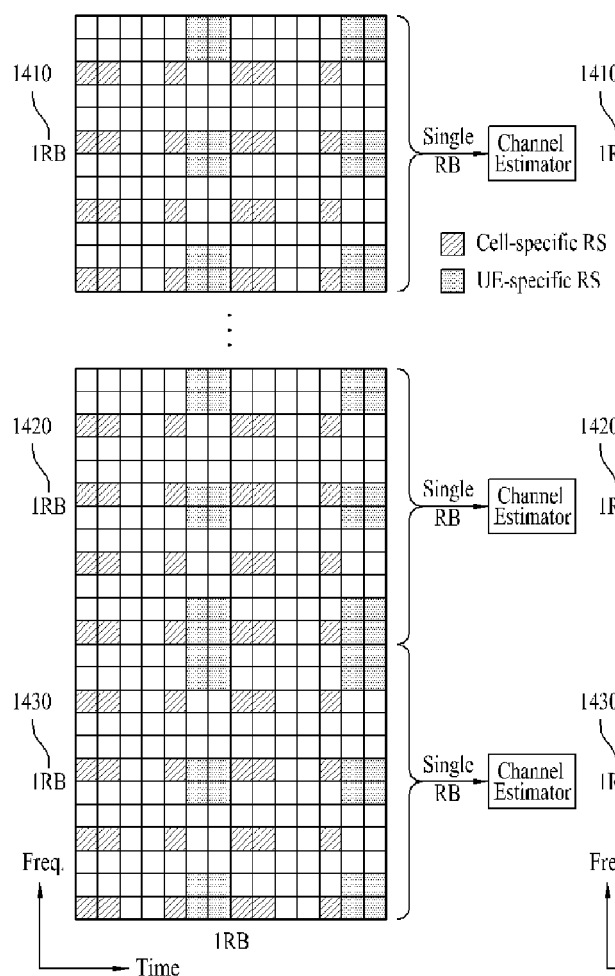
FIG. 14A illustrates an example of channel estimation without RB bundling.

With reference to FIG. 14A, a UE estimates the channel based on the RSs of individual RBs. That is, the UE estimates the channel based on RB 1410 in isolation, on RB 1420 in isolation, and on RB 1430 in isolation. It is understood that, although the channel estimation is performed based on each RB in isolation, this approach does not necessarily require the implementation of multiple channel estimators. Rather, the channel estimation per each RB may be performed sequentially by a single channel estimator in a timely manner.

Figure 14B:
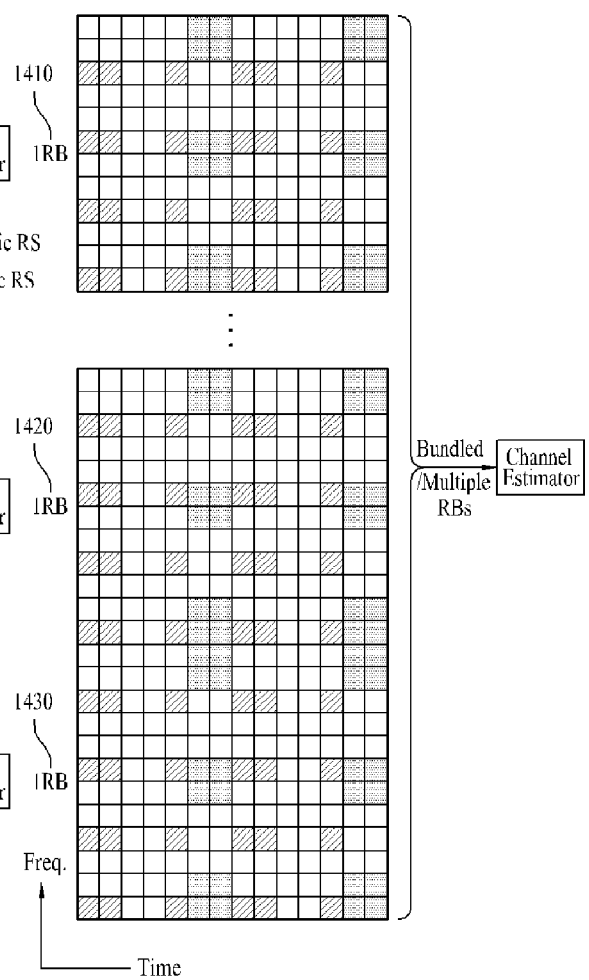
FIG. 14B illustrates an example of channel estimation with RB bundling according to one embodiment.

With reference to FIG. 14B, the UE estimates the channel based on the RSs of a bundle of two or more RBs. That is, the UE estimates the channel based on a bundle of RBs including RBs 1410, 1420, 1430 concurrently (the UE concurrently uses or processes a combination of the RS information provided in the RBs 1410, 1420 and 1430). A main difference between FIG. 14A and FIG. 14B is the dimension of the channel estimator. Since the channel estimator in FIG. 14B has, at a given time, access to a higher quantity of RS than the channel estimator in FIG. 14A, the former has additional freedom of signal processing on the channel estimation.

Resource Block Allocation

OFDM gives the freedom to allocate subcarriers to each scheduled user up to a FFT (Fast Fourier Transform) size. In LTE, more than 1000 subcarriers can be used depending on the bandwidth. However, the subcarrier is not the unit of actual usage in the resource allocation. Instead, a set of subcarriers is defined to alleviate the overhead of control signaling in the resource allocation. The set of subcarriers is the earlier-described RB. The introduction of the RB significantly decreases the amount of control signaling in the allocation; e.g., in the bandwidth spanning 20 MHz, where approximately 100 RBs span 1200 subcarriers, 1200 indications are needed for individual subcarriers allocated to individual users, while only 100 indications are required where individual RBs are allocated to individual users. 100 indications in 20 MHz may be viewed as an undesirably high amount of overhead in some cases. In such situations, a higher level of reduction in the number of indications would be needed. For this purpose, the allocation of RB to scheduled UEs could be restricted to a contiguous group of RBs.

One example of allocating groupings of RBs is illustrated in Table 1 below.

TABLE 1

| System Bandwidth | RB grouping Size |
| --- | --- |
| ≤10 | 1 |
| 11-26 | 2 |
| 27-63 | 3 |
| 64-110 | 4 |

According to Table 1, in allocating downlink resources to UEs, a group of a certain number of contiguous RBs is allocated to a UE. The number of RBs varies depending on the system bandwidth. For example, according to Table 1, when the system bandwidth is 10 RBs or less, then a group of 1 RB is allocated to the user. Also, when the system bandwidth is 11 to 26 RBs, then a group of 2 contiguous RBs is allocated to the user. When the system bandwidth is 27 to 63 RBs, then a group of 3 contiguous RBs is allocated to the user. When the system bandwidth is 64 to 110 RBs, then a group of 4 contiguous RBs s allocated to the user.

The minimum unit of downlink resource allocation could be restricted to a multiple of the sizes listed in Table 1 according to the system bandwidth.

Granularity of CQI Reporting

The downlink channel status of a UE may be used to decide which UE should be scheduled (i.e., which UE is assigned downlink resources). In order to optimize the utilization of resources, the UE having the best channel condition in a given frequency should be allocated. Even in a fair scheduler, the channel quality indication is still vital information used in operating the scheduler. In TDD (Time Division Duplex), channel symmetry between uplink and downlink may be used to alleviate the burden of reporting channel status from a UE to a base station (e.g., a NodeB).

That is not the case for FDD (Frequency Division Duplex) since the uplink channel status which may be measured by the NodeB is quite different from the downlink channel status which is measured by the UE. Therefore, a channel status reporting scheme is implemented in LTE, and the indicator is referred to as a CQI (Channel Quality Indicator). The CQI provides key information to the NodeB for improved scheduling of downlink resources to the UEs.

CQI is a measurement of a channel status, a degree to which a channel can transmit data with an error rate lower than a predetermined error rate. In a conventional (e.g., non-MIMO) system, the CQI can be represented as a single measurement, i.e., SNR (Signal-to-Noise Ratio), SINR (Signal-to-Interference-and-Noise Ratio), or MCS (Modulation and Coding Scheme) Index. However, in a system using MIMO, CQI should also cover the expanded dimension, i.e., the space domain. The use of multiple antennas adds freedom in space, which may be measured in the form of an RI (Rank Index). Moreover, a more sophisticated MIMO scheme could be used, e.g., a Precoded MIMO system, in SM (Spatial Multiplexing) or Beamforming, which requires another indication of precoding, e.g., PMI (Precoding Matrix Indication). According to one embodiment, the CQI in a MIMO system may include the MCS, RI and PMI.

CQI could be interpreted as that it has a meaning only when it is related to the downlink assignment. However, downlink channel assignment could be done by the expanded size of RBs as explained in the previous section, which requires the corresponding CQI reporting to match the size of unit for downlink assignment. So the RB grouping size of CQI reporting could be a multiple of size of RB grouping in downlink assignment. In one situation, the CQI reporting could be performed according to a unit of RBs smaller than the downlink assignment size or according to a unit consisting of a single RB. According to another situation, the reported CQI is applied according to the downlink assignment by a unit of grouped RBs. As such, the CQI is generated and reported according to the unit of multiple RBs which could be used in the actual downlink assignment.

DCI (Downlink Control Information)

The DCI provides the terminal (e.g., UE) with the necessary information for proper reception and decoding of the downlink data transmission. Information delivered in the DCI may include or indicate a DCI format indicator, resource block assignment, modulation and coding scheme, redundancy version, new data indicator, Hybrid ARQ (HARQ) process number, precoding information, the number of the transmission layer, PUCCH transmit power control message and RNTI.

Since many transmission modes exist in LTE depending mostly on the MIMO mode (e.g., transmit diversity mode, spatial multiplexing mode), a correspondingly high number of types (formats) of DCI are also needed. As such, a DCI format indicator is implemented as a DCI field. Scheduling in the time and frequency domains is delivered via a resource block assignment field. The modulation and coding scheme indicates the type of modulation and error correction coding for scheduled transport block. Sometimes, modulation and coding for a second codeword may be transmitted only when the two codewords are used in spatial multiplexing MIMO mode. HARQ-related information includes redundancy version, new data indicator and HARQ process number. For MIMO support, precoding information and the number of the transmission layer may be included. As previously noted, the acronym "RNTI" refers to a Radio Network Temporary Identifier. The RNTI is used to identify a UE when a Radio Resource Control (RRC) connection exists. The following types of RNTI are defined: C-RNTI (Cell RNTI), S-RNTI (Serving RNC RNTI) and U-RNTI (UTRAN RNTI).

In order for future telecommunication systems to support increasingly high data rates and a higher number of transmission antennas, additional UE-specific RS is provided. Since the RS itself is considered as overhead from a system perspective, the amount of the RS should be balanced due to the tradeoff between the channel estimation performance and the system throughput. According to embodiments of the present invention, if the RS is configured to be processed over several RBs (see, e.g., FIG. 14B), the channel estimation performance based on the RS is enhanced based on the system bandwidth.

According to particular embodiments, in estimating a channel (e.g., a condition of the channel), a UE bundles the received RBs into bundles of one or more RBs, where the size of the RB bundle is dependent on the system bandwidth. According to one embodiment, the size of the system bandwidth is provided to the UE from the network.

The UE-specific RS allows the UE to estimate the downlink channel status. An aspect of the present invention draws a relationship between the UE-specific RS and the downlink channel assignment which is scheduled by a NodeB. According to embodiments of the present invention, the manner in which RBs are bundled by a UE to perform channel estimation is associated with the grouping of RBs in the downlink channel assignment (see, e.g., Table 1).

For convenience of notation, the terms RB bundling of UE-specific RS, RB bundling and, simply, bundling are used interchangeably in the description below.

RB Bundling of the Same Size as RB Grouping

The ultimate goal of UE-specific RS is to help the UE to demodulate the scheduled data without error. According to embodiments of the present invention, since UE-specific RS is closely related to data actually assigned to the scheduled UE, a relationship is drawn between the UE-specific RS and the scheduled data. According to a particular embodiment, the size of an RB bundle of UE-specific RS is equal to the size of the RB grouping in the downlink assignment. By matching these two sizes, the RS may be fully utilized within the allocated RBs without any waste of processing in the decoding of the RS.

Figure 15A:
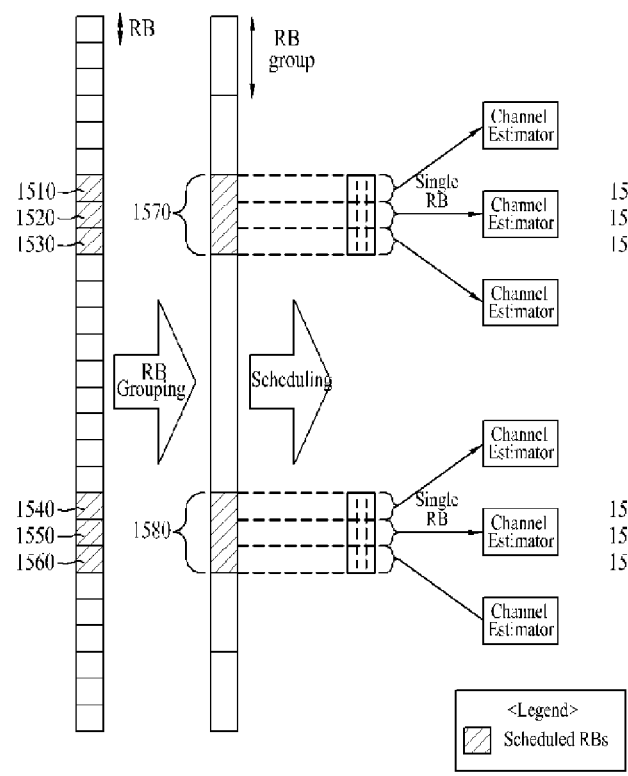
FIG. 15A illustrates an example of channel estimation without RB bundling.
Figure 15B:
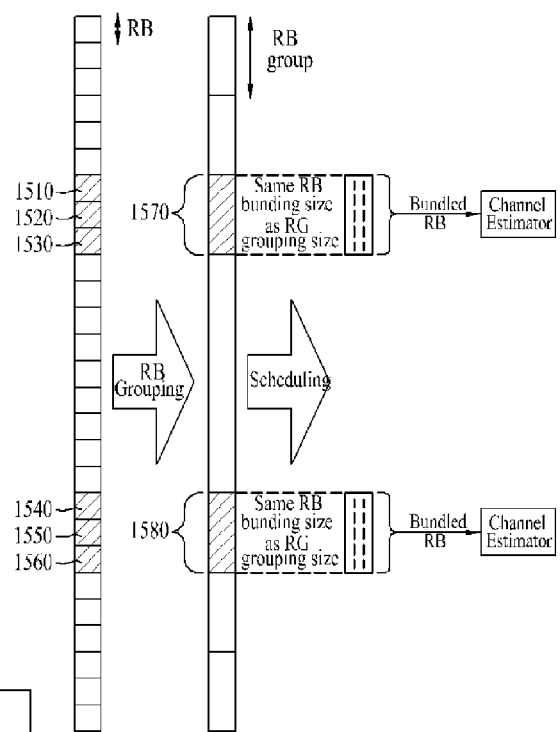
FIG. 15B illustrates an example of channel estimation with RB bundling according to one embodiment.

An example of such matching is now described with reference to FIGS. 15A and 15B. According to this example, the size of the system bandwidth is 27 RBs. Referring back to Table 1, this particular size corresponds to groupings of three contiguous RBs. With reference to FIGS. 15A and 15B, contiguous RBs 1510, 1520 and 1530 are grouped together as RB group 1570 in the downlink allocation. Similarly, contiguous RBs 1540, 1550 and 1560 are grouped together as RB group 1580 in the downlink allocation. As illustrated in FIGS. 15A and 15B, RBs scheduled for a particular user do not necessarily need to be contiguous. For example, RB groups 1570 and 1580 are not contiguous. As such, RB groups in a particular assignment may be scattered, as illustrated in FIGS. 15A and 15B.

With reference to FIG. 15A, a UE estimates the channel based on the RSs (e.g., UE-specific RS) of individual RBs. That is, the UE estimates the channel based on the RBs of RB group 1570 in isolation with respect to one another. That is, the UE estimates the channel based on RB 1510 in isolation, RB 1520 in isolation, and RB 1530 in isolation. The UE estimates the channels based on the RBs of RB group 1580 in a similar manner. It is understood that, although the channel estimation is performed based on each RB in isolation, this approach does not necessarily require the implementation of multiple channel estimators. Rather, the channel estimation per each RB may be performed sequentially by a single channel estimator in a timely manner.

In contrast, with reference to FIG. 15B, the UE estimates the channel based on the RSs (e.g., UE-specific RS) of a bundle of RBs. The size of the bundle may be at least two RBs. As illustrated in FIG. 15B, the UE estimates the channel based on a bundle of three RBs (corresponding to group 1570) including RBs 1510, 1520, 1530 concurrently (the UE concurrently uses or processes a combination of the RS information provided in the RBs 1510, 1520 and 1530). Similarly, the UE estimates the channel based on a bundle of three RBs (corresponding to group 1580) including RBs 1540, 1550, 1560 concurrently. The size of the bundle is equal to the size of the RB grouping (i.e., 3 RBs). Because the size of the RB grouping is dependent on the system bandwidth (see, e.g., Table 1), the size of the bundle is also dependent on the system bandwidth.

Since the channel estimator of FIG. 15B has, at a given time, access to a higher quantity of RS than the channel estimator of FIG. 15A, the former has additional freedom of signal processing on the channel estimation.

As previously explained, in the example illustrated in FIGS. 15A and 15B, the size of the system bandwidth was assumed to be 27 RBs. In accordance with Table 1, according to one embodiment, the size of each bundle is 3 RBs when the system bandwidth is between 27 RBs and 63 RBs. Also in accordance with Table 1, according to one embodiment, the size of each bundle is 2 RBs when the system bandwidth is between 11 RBs and 26 RBs. Also in accordance with Table 1, according to one embodiment, the size of each bundle is 1 RB when the system bandwidth is equal to or less than 10 RBs. According to a particular embodiment, the RBs in a particular bundle are contiguous.

RB Bundling Size as a Multiple of RB Grouping Size

Even though the minimum unit of downlink channel allocation may be relatively small (e.g., 3 RBs), the actual channel assignment may be performed based on a larger unit, e.g., a multiple of minimum group size. According to embodiments of the present invention, the size of the RB bundles is equal to a multiple (e.g., an integer multiple) of the size of the RB grouping. For example, if the size of the RB grouping is 3 RBs, then the size of the RB bundles may be equal to 6 RBs, 9 RBs, etc.

Figures 16A, 16B:
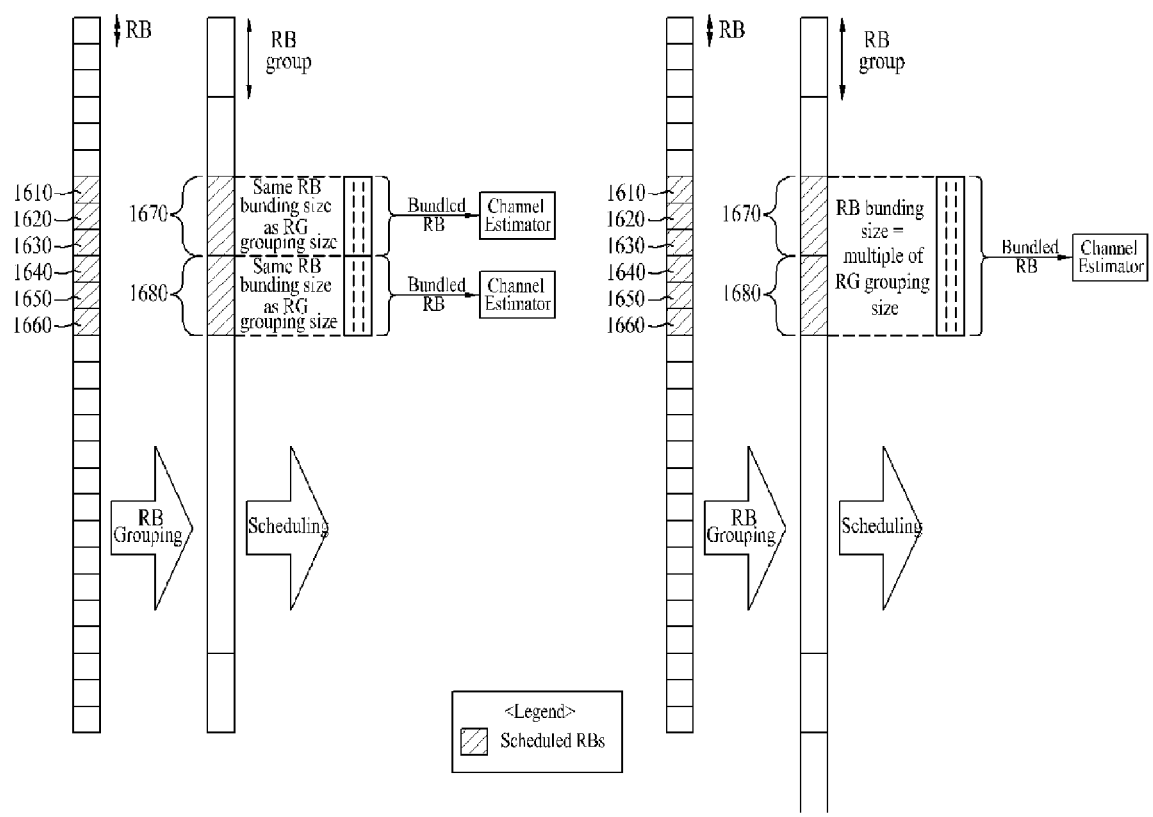
FIG. 16A illustrates an example of channel estimation with RB bundling according to one embodiment.
FIG. 16B illustrates an example of channel estimation with RB bundling according to one embodiment.

An example of such matching is now described with reference to FIGS. 16A and 16B. According to this example, the size of the system bandwidth is 27 RBs. Referring back to Table 1, this particular size corresponds to groupings of three contiguous RBs. With reference to FIGS. 16A and 16B, contiguous RBs 1610, 1620 and 1630 are grouped together as RB group 1670 in the downlink allocation. Similarly, contiguous RBs 1640, 1650 and 1660 are grouped together as RB group 1680 in the downlink allocation.

With reference to FIG. 16A, a UE estimates the channel based on the RSs (e.g., UE-specific RS) of individual RBs. That is, the UE estimates the channel based on the RB bundles (respectively corresponding to groups 1670, 1680) in isolation with respect to one another. That is, the UE estimates the channel based on the RB bundle corresponding to group 1670 in isolation and on the RB bundle corresponding to group 1680 in isolation.

In contrast, with reference to FIG. 16B, the UE estimates the channel based on multiple RB bundles. As illustrated in FIG. 16B, the UE estimates the channel based on the bundles noted in the above paragraph concurrently (the UE concurrently uses or processes a combination of the RS information provided in the RB bundles).

Non-Contiguous RB Bundling

According to embodiments of the present invention, the downlink allocation is performed in a discontinuous manner in order to achieve an increased diversity gain in the frequency domain. In that case, the allocated RBs may be separated from each other by one or more RBs. According to embodiments of the present invention, RB bundling is also applied to a situation involving allocation of non-contiguous RBs. As such, bundling provides the channel estimator with additional freedom of processing to the channel estimator without harming the channel estimation performance.

The example illustrated in FIG. 17A is similar to the example illustrated in FIG. 15B. In FIG. 17A, the UE estimates the channel based on the RSs (e.g., UE-specific RS) of a bundle of RBs. The size of the bundle may be at least two RBs. As illustrated in FIG. 17A, the UE estimates the channel based on a bundle of three contiguous RBs including RBs 1710, 1711, 1712 concurrently (the UE concurrently uses or processes a combination of the RS information provided in the contiguous RBs 1710, 1711, 1712).

With reference to FIG. 17B, according to one embodiment, the UE estimates the channel based on a bundle non-contiguous RBs. For example, as illustrated in FIG. 17B, the UE estimates the channel based on a bundle of five non-contiguous RBs including RBs 1710, 1713, 1716, 1719, 1722 concurrently (the UE concurrently uses or processes a combination of the RS information provided in the non-contiguous RBs 1710, 1713, 1716, 1719, 1722).

RB Bundling Boundary Aligned with the Boundary RB Assignment

When RBs are grouped together in the downlink and the RBs are bundled by a scheduled UE, one or more of the bundles may include UE-specific RS specific to other UEs. Here, according to certain embodiments described earlier, such information intended for other UEs may be considered by the UE in performing channel estimation. This may occur when the scheduled UE is not aware of the signature (or other characteristic) of the other UEs such that the scheduled UE can not fully utilize the RS information specific to the other UEs. As such, embodiments of the present invention are directed to align the boundary of an RB bundle with only a portion of the corresponding RB grouping when the grouping is not entirely allocated to the scheduled UE. By aligning the boundary of the bundled RB with only such a portion (the portion of the RB grouping corresponding to the scheduled UE), the UE-specific RS for the scheduled UE may be utilized without interference from UE-specific RS of the other UEs.

Figures 18A, 18B:
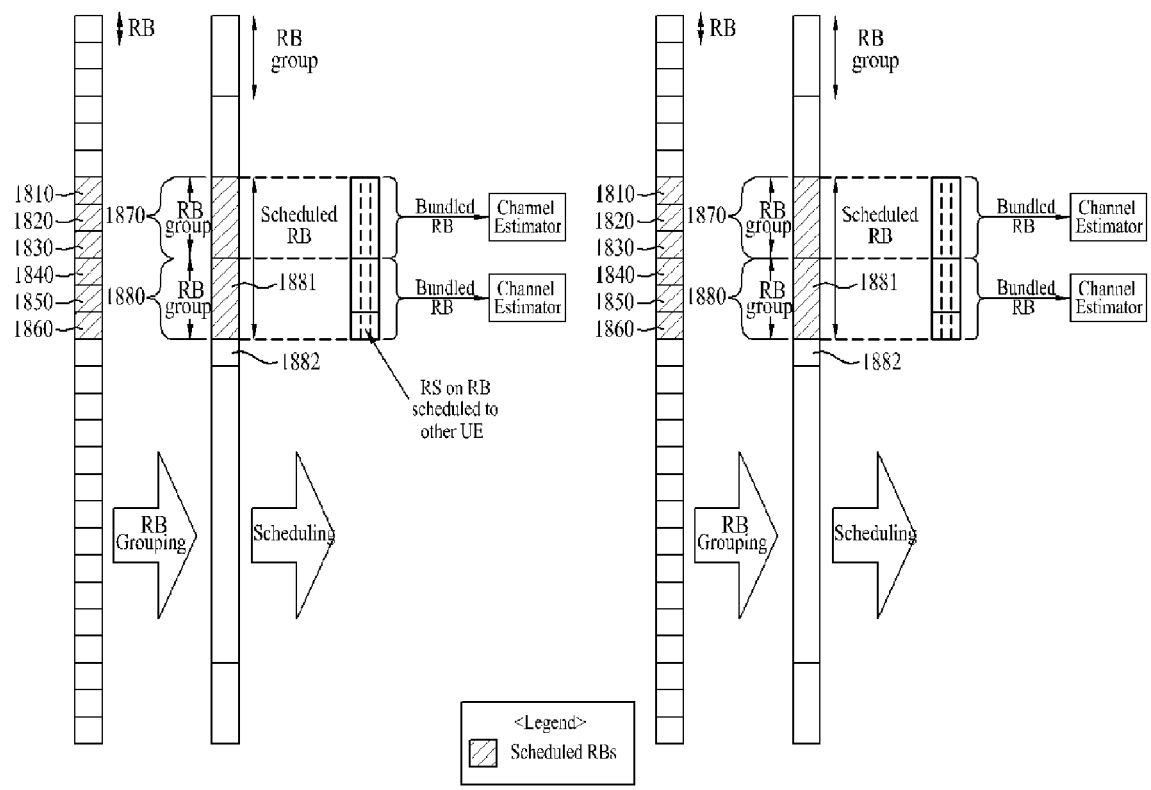
FIG. 18A illustrates an example of channel estimation with RB bundling according to one embodiment.
FIG. 18B illustrates an example of channel estimation with RB bundling according to one embodiment.

An example of such an alignment is now described with reference to FIGS. 18A and 18B. According to this example, the size of the system bandwidth is 27 RBs. Referring back to Table 1, this particular size corresponds to groupings of three contiguous RBs. With reference to FIGS. 18A and 18B, contiguous RBs 1810, 1820 and 1830 are grouped together as RB group 1870 in the downlink allocation. Similarly, contiguous RBs 1840, 1850 and 1860 are grouped together as RB group 1880 in the downlink allocation.

With reference to FIG. 18A, the UE estimates the channel based on a bundle of three RBs (corresponding to group 1870) including RBs 1810, 1820, 1830 concurrently (the UE concurrently uses or processes a combination of the RS information provided in the RBs 1810, 1820 and 1830). As illustrated in FIG. 18A, the group 1880 is also allocated to the scheduled UE. Specifically, the RS content of the group 1880 corresponding to RBs 1840, 1850 (see, e.g., portion 1881) is allocated to the scheduled UE. However, the RS content of the group 1880 corresponding to RB 1860 (see, e.g., portion 1882), which contains UE-specific RS for other UEs, is also allocated to the scheduled UE.

With reference to FIG. 18B, according to one embodiment of the present invention, the boundary of an RB bundle is aligned with a portion of the corresponding RB grouping that contains RS content allocated to the scheduled UE. For example, as illustrated in FIG. 18B, the bundle corresponding to group 1880 is aligned to end at the boundary dividing portions 1881 and 1882. As such, the bundle is considered as a fractionally bundled RB. In more detail, the bundle includes the portions of the group 1880 corresponding to RBs 1840 and 1850. However, the bundle does not include the portion of the group corresponding to RB 1860. As such, the UE-specific RS for the scheduled UE may be utilized without interference from UE-specific RS of the other UEs.

DCI Format Indication

According to embodiments of the present invention, a DCI field is established to impart information related to the bundling concepts described herein. This DCI field may be part of control signaling related to the downlink assignment conveyed via DCI on PDCCH.

Various embodiments will be described with reference to the DCI structures illustrated in FIGS. 19A, 19B, 19C and 19D. If the size of the RB bundles is assumed to be equal to the RB group size which is used in downlink scheduling (see, e.g., FIG. 15B), then it may not be necessary to indicate the RB bundling size to the UE. As such, the existing DCI structure may not be modified (see, e.g., FIG. 19A).

Figure 19A:
FIGS. 19A, 19B, 19C and 19D illustrate DCI structures according to various embodiments.
Figure 19B:
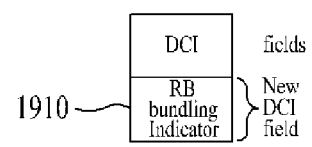

If a UE may be controlled to switch between implementing RB bundling (see, e.g., FIG. 15B) and not implementing RB bundling (see, e.g., FIG. 15A), then the DCI structure may be modified to include an indicator 1910 indicating whether RB bundling is to be switched on or off (see, e.g., FIG. 19B).

If the size of the RB bundles is assumed to be a multiple of the RB group size which is used in downlink scheduling (see, e.g., FIG. 16B), then it may be necessary to indicate the RB bundling size to the UE. As such, the existing DCI structure may be modified to include an indicator 1920, 1930 indicating the size of the RB bundles (see, e.g., FIGS. 19C and 19D). In the structure illustrated in FIG. 19C, the structure also includes the indicator 1910 that was described with reference to FIG. 19B. In the structure illustrated in FIG. 19D, the indicator 1910 is omitted. This structure is suitable when the UE is configured to recognize that a particular bundling size (e.g., 0) corresponds to a switching off of the RB bundling.

Figure 19C:
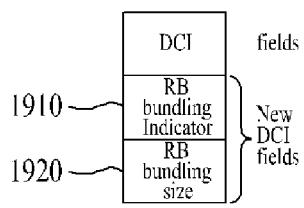
Figure 19D:
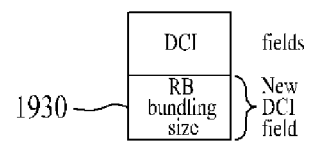

If the size of RB bundling is fixed to be equal to the size of RB group (e.g., the sizes provided in Table 1), then the additional fields described with reference to FIGS. 19B, 19C and 19D may not be necessary. According to one embodiment, even if the size of the RB bundles is variable, if a predetermined one-to-one mapping between RB bundling size and the DCI format is implemented, then further indicators relating to the RB bundling may not be necessary. Once the UE is informed of the DCI format, it may also determine the RB bundling size (also whether RB bundling is to be turned on) based on the predetermined mapping between the RB bundling size and the DCI format.

The foregoing embodiments and advantages are merely exemplary and are not to be construed as limiting the present invention. The present teaching can be readily applied to other types of apparatuses and processes. The description of embodiments of the present invention is intended to be illustrative, and not to limit the scope of the claims. Many alternatives, modifications, and variations will be apparent to those skilled in the art.

What is claimed is:

1. A method of evaluating information related to a channel state for resource blocks (RBs) including user equipment (UE)-specific reference signals by a UE in a wireless communication system, the method comprising:

receiving information related to a system bandwidth from a base station (BS), wherein a RB size of the system bandwidth, a size of a RB group (RBG) for resource allocation, and a size of a RBG for evaluating information related to a channel state are related as shown in Table A; and evaluating the information related to the channel state when each RB of the RBG for evaluating the information related to the channel state comprises the UE-specific reference signals, wherein the information related to the channel state is evaluated in unit of 1 RB when the system bandwidth is smaller than or equal to 10 RBs, wherein the information related to the channel state is evaluated in unit of 1 RB when the system bandwidth is between 11 RBs and 26 RBs, and wherein the information related to the channel state is evaluated in unit of 1 RB when the system bandwidth is between 27 RBs and 63 RBs,

TABLE A

| System Bandwidth (RBs) | RBG size for resource allocation (number of RBs) | RBG size for evaluating the information related to the channel state (number of RBs) |
|---|---|---|
| ≤10 | 1 | 1 |
| 11-26 | 2 | 1 |
| 27-63 | 3 | 1 |
| 64-110 | 4 | 1 |

2. The method of claim 1, wherein the information related to the channel state comprises a precoding matrix indicator (PMI) or a rank indicator (RI).

3. The method of claim 1, wherein the UE-specific reference signals are received through a plurality of antenna ports.

4. The method of claim 1, further comprising:
transmitting the evaluated information related to the channel state to the BS.

5. A method for receiving information related to a channel state by a base station (BS) in a wireless communication system, the method comprising:

transmitting information related to a system bandwidth to a user equipment (UE), wherein a RB size of the system bandwidth, a size of a RB group (RBG) for resource allocation, and a size of a RBG for evaluating information related to a channel state are related as shown in Table A; and receiving information related to a channel state from the UE, wherein the information related to the channel state is evaluated by the UE when each RB of the RBG for evaluating the information related to the channel state comprises UE-specific reference signals, wherein the information related to the channel state is evaluated in unit of 1 RB when the system bandwidth is smaller than or equal to 10 RBs, wherein the information related to the channel state is evaluated in unit of 1 RB when the system bandwidth is between 11 RBs and 26 RBs, and wherein the information related to the channel state is evaluated in unit of 1 RB when the system bandwidth is between 27 RBs and 63 RBs,

TABLE A

| System Bandwidth (RBs) | RBG size for resource allocation (number of RBs) | RBG size for evaluating the information related to the channel quality (number of RBs) |
|---|---|---|
| ≤10 | 1 | 1 |
| 11-26 | 2 | 1 |
| 27-63 | 3 | 1 |
| 64-110 | 4 | 1 |

6. The method of claim 5, wherein the information related to the channel state comprises a precoding matrix indicator (PMI) or a rank indicator (RI).

7. The method of claim 5, wherein the UE-specific reference signals are received through a plurality of antenna ports.

8. The method of claim 5, further comprising:
receiving the evaluated information related to the channel state from the UE.

9. A user equipment (UE) for evaluating information related a channel state in a wireless communication system, the UE comprising:
a radio frequency (RF) unit configured to receive information related to a system bandwidth from a base station (BS),
wherein a RB size of the system bandwidth, a size of a RB group (RBG) for resource allocation, and a size of a RBG for evaluating information related to a channel state are related as shown in Table A; and
a processor configured to evaluate the information related to the channel state when each RB of the RBG for evaluating the information related to the channel state comprises UE-specific reference signals,
wherein the information related to the channel state is evaluated in unit of 1 RB when the system bandwidth is smaller than or equal to 10 RBs,
wherein the information related to the channel state is evaluated in unit of 1 RB when the system bandwidth is between 11 RBs and 26 RBs, and
wherein the information related to the channel state is evaluated in unit of 1 RB when the system bandwidth is between 27 RBs and 63 RBs,

TABLE A

| System Bandwidth (RBs) | RBG size for resource allocation (number of RBs) | RBG size for evaluating the information related to the channel state (number of RBs) |
|---|---|---|
| ≤10 | 1 | 1 |
| 11-26 | 2 | 1 |
| 27-63 | 3 | 1 |
| 64-110 | 4 | 1 |

10. The UE of claim 9, wherein the information related to the channel state comprises a precoding matrix indicator (PMI) or a rank indicator (RI).

11. The UE of claim 9, wherein the UE-specific reference signals are received through a plurality of antenna ports.

12. The UE of claim 9, wherein the RF unit is further configured to transmit the evaluated information related to the channel state to the BS.

13. A base station (BS) for receiving information related to a channel state in a wireless communication system, the BS comprising:
a radio frequency (RF) unit; and
a processor configured to cause the RF unit to transmit information related to a system bandwidth to a user equipment (UE) and to receive information related to a channel state from the UE,
wherein a RB size of the system bandwidth, a size of a RB group (RBG) for resource allocation, and a size of a RBG for evaluating information related to a channel state are related as shown in Table A; and
wherein the information related to the channel state is evaluated by the UE when each RB of the RBG for evaluating the information related to the channel state comprises UE-specific reference signals,
wherein the information related to the channel state is evaluated in unit of 1 RB when the system bandwidth is smaller than or equal to 10 RBs,
wherein the information related to the channel state is evaluated in unit of 1 RB when the system bandwidth is between 11 RBs and 26 RBs, and
wherein the information related to the channel state is evaluated in unit of 1 RB when the system bandwidth is between 27 RBs and 63 RBs,

TABLE A

| System Bandwidth (RBs) | RBG size for resource allocation (number of RBs) | RBG size for evaluating the information related to the channel quality (number of RBs) |
|---|---|---|
| ≤10 | 1 | 1 |
| 11-26 | 2 | 1 |
| 27-63 | 3 | 1 |
| 64-110 | 4 | 1 |

14. The BS of claim 13, wherein the information related to the channel state comprises a precoding matrix indicator (PMI) or a rank indicator (RI).

15. The BS of claim 13, wherein the UE-specific reference signals are received through a plurality of antenna ports.

16. The BS of claim 13, wherein the RF unit is further configured to receive the evaluated information related to the channel state from the UE.

* * * * *